(12) United States Patent
Knoble et al.

(10) Patent No.: US 10,875,204 B2
(45) Date of Patent: Dec. 29, 2020

(54) MUNTIN BAR FABRICATION SYSTEM

(71) Applicant: Cardinal IG Company, Eden Prairie, MN (US)

(72) Inventors: Grant Michael Knoble, Dodgeville, WI (US); Joshua Hanzel, Mazomanie, WI (US); Kent Zehner, Mazomanie, WI (US)

(73) Assignee: Cardinal IG Company, Eden Prairie, MN (US)

( * ) Notice: Subject to any disclaimer, the term of this patent is extended or adjusted under 35 U.S.C. 154(b) by 0 days.

(21) Appl. No.: 16/439,868

(22) Filed: Jun. 13, 2019

(65) Prior Publication Data

US 2019/0291292 A1 Sep. 26, 2019

Related U.S. Application Data

(62) Division of application No. 14/961,520, filed on Dec. 7, 2015, now Pat. No. 10,328,594.

(51) Int. Cl.
*B23Q 7/14* (2006.01)
*B26D 5/00* (2006.01)
(Continued)

(52) U.S. Cl.
CPC .............. *B26D 5/005* (2013.01); *B23C 3/002* (2013.01); *B23K 26/38* (2013.01);
(Continued)

(58) Field of Classification Search
CPC .. B23C 3/002; Y10T 29/5145; Y10T 29/5142
See application file for complete search history.

(56) References Cited

U.S. PATENT DOCUMENTS 5,451,132 A 9/1995 Tokiwa
5,574,651 A 11/1996 McKeegan et al.
(Continued)

FOREIGN PATENT DOCUMENTS

DE 19633899 A1 2/1998
DE 102014016629 A1 5/2016
EP 2172301 A1 4/2010

OTHER PUBLICATIONS

Machine Translation of DE 19633899-A 1, which DE '899 was published Feb. 1998.

*Primary Examiner* — Jason L Vaughan
*Assistant Examiner* — Amanda Kreiling
(74) *Attorney, Agent, or Firm* — Fredrikson & Byron, P.A.

(57) ABSTRACT

A muntin bar fabrication system can be used to efficiency produce a wide variety of different types of muntin bars, allowing the fabrication of both standard and custom muntin bar assemblies for doors, windows, and other fenestration products. In some examples, the fabrication system includes a muntin bar stock storage assembly that holds multiple different types of muntin bar stock. The system also includes a muntin bar stock extraction device that extracts one of the different types of muntin bar stock from the storage assembly and conveys the extracted muntin bar stock to a feed device. The feed device feeds the extracted piece of muntin bar stock into a cutting system that includes a multi-axis cutter. The cutting system that performs one or more cutting operations on the extracted muntin bar stock so as to fabricate one or more individual muntin bars from the extracted muntin bar stock.

8 Claims, 15 Drawing Sheets

(51) Int. Cl.

| | | |
|---|---|---|
| *B26D 7/06* | (2006.01) | |
| *B26D 9/00* | (2006.01) | |
| *B26D 11/00* | (2006.01) | |
| *B26D 7/01* | (2006.01) | |
| *B23Q 7/00* | (2006.01) | |
| *B23Q 7/10* | (2006.01) | |
| *B23Q 7/06* | (2006.01) | |
| *B23Q 7/04* | (2006.01) | |
| *B23P 23/04* | (2006.01) | |
| *B65G 47/90* | (2006.01) | |
| *B23C 3/00* | (2006.01) | |
| *B23K 37/02* | (2006.01) | |
| *B23K 37/04* | (2006.01) | |
| *B23K 26/38* | (2014.01) | |
| *E06B 3/68* | (2006.01) | |
| *B23K 101/28* | (2006.01) | |
| *B23K 103/04* | (2006.01) | |
| *B23K 103/10* | (2006.01) | |
| *B23K 103/00* | (2006.01) | |

(52) U.S. Cl.
CPC .......... *B23K 37/0235* (2013.01); *B23K 37/04* (2013.01); *B23P 23/04* (2013.01); *B23Q 7/001* (2013.01); *B23Q 7/042* (2013.01); *B23Q 7/06* (2013.01); *B23Q 7/10* (2013.01); *B23Q 7/141* (2013.01); *B26D 7/01* (2013.01); *B26D 7/0608* (2013.01); *B26D 7/0633* (2013.01); *B26D 7/0641* (2013.01); *B26D 9/00* (2013.01); *B26D 11/00* (2013.01); *B65G 47/901* (2013.01); *B23K 2101/28* (2018.08); *B23K 2103/05* (2018.08); *B23K 2103/10* (2018.08); *B23K 2103/36* (2018.08); *B23K 2103/42* (2018.08); *B23Q 7/043* (2013.01); *B26D 2007/013* (2013.01); *E06B 3/685* (2013.01); *Y10T 29/5142* (2015.01); *Y10T 29/5145* (2015.01); *Y10T 83/647* (2015.04); *Y10T 83/6476* (2015.04); *Y10T 83/6571* (2015.04); *Y10T 409/304536* (2015.01)

(56) References Cited

U.S. PATENT DOCUMENTS

| | | |
|---|---|---|
| 5,862,584 A | 1/1999 | Manser |
| 5,911,803 A * | 6/1999 | Miyano .................. B23Q 7/001 414/18 |
| 6,021,701 A | 2/2000 | McKeegan, Jr. et al. |
| 6,173,484 B1 * | 1/2001 | McGlinchy ........... B21C 37/155 29/417 |
| 6,438,819 B1 | 8/2002 | McGlinchy et al. |
| 6,591,988 B2 | 7/2003 | Trpkovski |
| 6,678,938 B2 | 1/2004 | McGlinchy et al. |
| 6,739,101 B2 | 5/2004 | Trpkovski |
| 6,868,596 B2 | 3/2005 | Reichert |
| 7,076,927 B2 | 7/2006 | Trpkovski |
| 7,167,767 B2 | 1/2007 | Clayton et al. |
| 7,448,120 B2 | 11/2008 | Ohmori |
| 7,610,681 B2 | 11/2009 | Calcei et al. |
| 7,854,097 B2 | 12/2010 | Schlyper et al. |
| 7,901,526 B2 | 3/2011 | James et al. |
| 2014/0109370 A1 | 4/2014 | Pemberton et al. |

\* cited by examiner

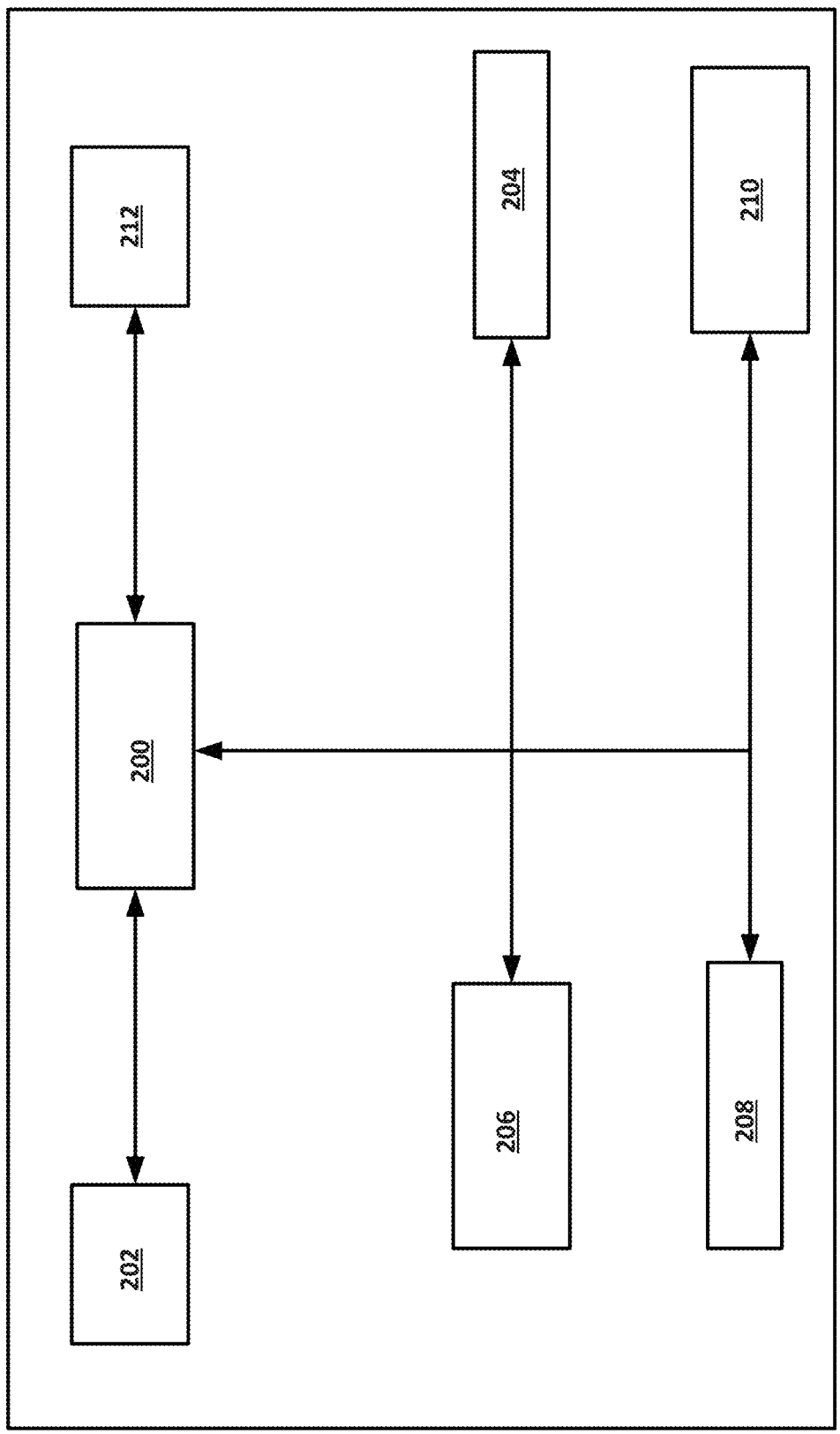

MUNTIN BAR FABRICATION SYSTEM

RELATED MATTERS

This application is a divisional of U.S. patent application Ser. No. 14/961,520, filed Dec. 7, 2015, the entire contents of which are incorporated herein by reference.

TECHNICAL FIELD

This disclosure relates to systems for fabricating muntin bars from muntin bar stock.

BACKGROUND

Insulating glazing (IG) units, such as windows and doors, are typically formed of two or more glass panes separated by a spacer. The spacer can contain desiccant that keeps the interior of the IG unit free of moisture during its service life. To increase the insulating properties of the IG unit, the space between the glass panes it typically filled with an insulating gas, such as argon or krypton.

For aesthetic reasons, some IG units include muntin bars inside of the gas space established by the spacer. The muntin bars, which may also be called glazing bars or sash bars, divide a single window into a grid system of small panes of glass, called lites. Typical muntin bar patterns include grids of rectangles, squares, or diamonds. Muntin bars create the visual appearance that the window is formed of multiple, small pieces of glass joined together by the muntin bars instead of large, unitary panes of glass. This replicates the appearance of early windows and doors, which were formed of small panes of glass joined together instead of large unitary panes of glass, which were more expensive and difficult to manufacture.

In practice, muntin bar assemblies are usually formed by cutting individual pieces of muntin bar from longer sections of muntin bar stock and then joining the individual pieces together to form a grid pattern. This may involve cutting each individual piece to a required length, cutting the ends of the muntin bar to allow different pieces to be joined together in abutting arrangement, and cutting away sections of the muntin bar to allow different pieces of muntin bar to be laid over one another in overlapping arrangement. In high-volume production facilities where muntin bar assemblies of the same size, shape, and pattern are produced over and over, tooling and equipment can be arranged to repeatedly cut the specific pieces of muntin bar required to make the muntin bar assembly.

While manufacturers can arrange equipment to repeatedly produce identical muntin bar assemblies, consumers are increasing demanding more customized and varied fenestration products. These customized products often include muntin bar assemblies with non-standard sizes, shapes, patterns, and types of muntin bar. Fabricating each muntin bar assembly on a customized basis can be a time consuming and costly process.

SUMMARY

In general, this disclosure is directed to devices, systems, and techniques for fabricating muntin bar assemblies. In some examples, a muntin bar fabrication system includes a muntin bar stock storage assembly that holds multiple different types of muntin bar stock and an extraction device. The extraction device is configured to extract a particular one of the multiple different types of muntin bar stock from the storage assembly and convey the extracted muntin bar stock to a feed device. After depositing the extracted piece of muntin bar stock, the feed device can feed the piece of muntin bar stock into a cutting system that includes a multi-axis cutter. The multi-axis cutter can perform one or more cutting operations on the piece of muntin bar stock. For example, the multi-axis cutter may cut the end of the muntin bar stock first fed into the cutting system to shape the end for forming a butt joint or coped joint. After the feed device advances the piece of muntin bar stock farther into the cutting system, the multi-axis cutter may cut out a section of the muntin bar stock to form a half-lap joint. After the feed device advances the muntin bar stock yet farther into the cutting system, the multi-axis cutter may cut the muntin bar stock crosswise, causing an individual piece of muntin bar of desired length to separate from the remainder of the muntin bar stock. In this way, the muntin bar fabrication system can extract a particular type of muntin bar stock (e.g., particular size, shape, color), cut the muntin bar stock to a custom size, and perform one or more cutting operations on the muntin bar stock, thereby facilitating quick and efficient fabrication of a muntin bar assembly.

While a muntin bar fabrication system according to the disclosure can have a variety of different features, in some examples, the system includes a plurality of muntin bar stock storage assemblies. For example, the system may include a first muntin bar stock storage assembly that is configured to receive individual pieces of muntin bar stock. In operation, an operator may load individual pieces of muntin bar stock into the first muntin bar stock storage assembly, such as a type of muntin bar stock that is custom to a specific assembly or otherwise used in low volume. The system may also include a second muntin bar stock storage assembly that holds multiple pieces of the same type of muntin bar stock. The type of muntin bar stock held in the second muntin bar storage assembly may be of a type that is used on a higher volume basis. In operation, the extraction device can extract a piece of muntin bar stock from either the low-volume first muntin bar stock storage assembly or the high-volume second muntin bar stock storage assembly and deliver the extracted piece of muntin bar to the feed device. For example, the extraction device may alternate between extracting pieces of muntin bar stock out of the low-volume first muntin bar stock storage assembly and the high-volume second muntin bar stock storage assembly. This can allow the system to switch between producing pieces of muntin bar for muntin bar assemblies that are produced in higher volume and producing pieces of muntin bar for lower volume and highly custom muntin bar assemblies.

To allow the muntin bar fabrication system to produce a variety of different types of custom pieces of muntin bar, the fabrication system can include a cutting system that has multiple cutting tools. For example, the cutting system may include a multi-axis cutter, such as a three-axis cutter, that can make complex cuts to the muntin bar stock. In operation, the multi-axis cutter may make angled cuts and notch cuts to the muntin bar stock, e.g., in addition to making straight or transverse cuts to separate an individual muntin bar piece from the reminder of the muntin bar stock. As another example, the cutting system may include punches that can punch into and/or through a piece of muntin bar stock positioned inside of the cutting system. A selected one of the punches may punch holes in the muntin bar stock that are configured (e.g., sized, shaped, positioned) to receive corresponding protrusions on a joining key that is inserted between different pieces of muntin bar when fabricating a muntin bar assembly. Additionally or alternatively, a select one of the punches may punch notches into the muntin bar stock, e.g., removing a section of the muntin bar that provides a gap for an overlapping joint with a separate piece of muntin bar. A muntin bar fabrication system according to the disclosure can have a variety of other features as described herein.

In one example, a muntin bar fabrication system is described that includes a muntin bar stock storage assembly, a muntin bar stock extraction device, a muntin bar feed device, and a cutting system. The muntin bar stock storage assembly is configured to receive and hold a plurality of different types of muntin bar stock. The muntin bar stock extraction is device configured to extract one of the plurality of different types of muntin bar stock from the muntin bar stock storage assembly and convey the extracted muntin bar stock to a muntin bar stock feed device. The cutting system includes a multi-axis cutter and is configured to receive the extracted muntin bar stock and perform one or more cutting operations on the extracted muntin bar stock so as to fabricate one or more individual muntin bars from the extracted muntin bar stock.

In another example, a muntin bar fabrication system is described that includes a first muntin bar storage assembly, a second muntin bar storage assembly, a muntin bar pull mechanism, a muntin bar stock extraction device, and a cutting system. The first muntin bar stock storage assembly has a plurality of laterally spaced apart receiving cavities configured to receive and hold different types of muntin bar stock. The second muntin bar stock storage assembly is configured to receive and hold at least one container containing a plurality of pieces of muntin bar stock in a vertically stacked arrangement. The muntin bar pull mechanism is configured to grasp a piece of muntin bar stock out of a select one of the plurality of laterally spaced apart receiving cavities of the first muntin bar stock storage assembly and pull the piece of muntin bar stock longitudinally out of the first muntin bar stock storage assembly. The muntin bar stock extraction device is configured to translate relative to the first muntin bar stock storage assembly and the second muntin bar stock storage assembly, vertically lower and grasp a piece of muntin bar stock pulled out of the first muntin bar storage assembly or a piece of muntin bar stock held in the at least one container of the second muntin bar stock storage assembly, vertically raise with a grasp piece of muntin bar stock, translate over to a muntin bar feed mechanism, and deposit the grasp piece of muntin bar on the muntin bar feed mechanism to provide an extracted muntin bar stock. The cutting system is positioned downstream of the muntin bar feed mechanism and is configured to receive the extracted muntin bar stock via the muntin bar feed mechanism and perform one or more cutting operations on the extracted muntin bar stock so as to fabricate one or more individual muntin bars from the extracted muntin bar stock.

In another example, a method is described that includes extracting one of a plurality of different types of muntin bar stock from a muntin bar stock storage assembly and conveying the extracted muntin bar stock to a muntin bar stock feed device. The method also includes depositing the extracted muntin bar stock on the muntin bar stock feed device and feeding the extracted muntin bar stock into a cutting system via the muntin bar stock feed device. The method further involves performing one or more cutting operations on the extracted muntin bar stock within the cutting system and thereby fabricating one or more individual muntin bars from the extracted muntin bar stock.

The details of one or more examples are set forth in the accompanying drawings and the description below. Other features, objects, and advantages will be apparent from the description and drawings, and from the claims.

BRIEF DESCRIPTION OF DRAWINGS

FIG. 14 is a functional block diagram illustrating an example muntin bar fabrication system.

DETAILED DESCRIPTION

Figure 1:
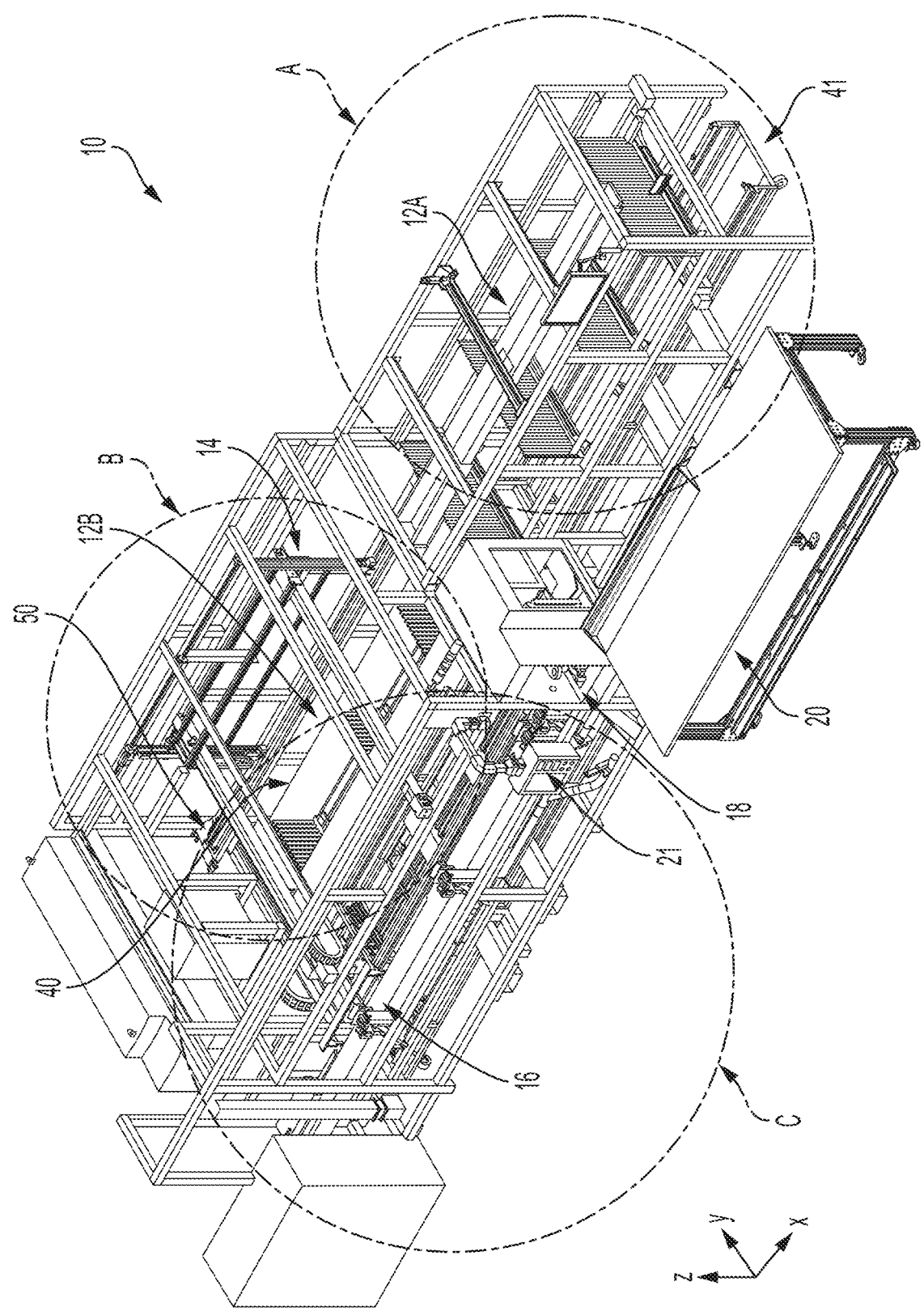
FIG. 1 is a perspective view of an example system for fabricating muntin bars.

In general, an insulating glazing unit provides an optically transparent thermally insulating structure that can be mounted in the wall of a building. In different examples, the insulating glazing unit may fabricated from two panes of material, which may be referred to as a double pane insulating glazing unit, three panes of material, which may be referred to as a triple pane insulating glazing unit, or even four or more panes of material. Each pane of material in the insulating glazing unit may be separated from an opposing pane of material by a between-pane space, which may be filled with an insulative gas or evacuated to create a vacuum. Increasing the size and number of between-pane spaces in the insulating glazing unit typically increases the thermal efficiency of the unit by reducing the thermal conductivity across the insulating glazing unit. In addition, in some insulating glazing unit designs, a muntin bar assembly is positioned in the between-pane space, e.g., before sealing the between-pane space and filling it with insulative gas or evacuating the space. The muntin bar assembly may be a grid pattern, e.g., of rectangles, squares, diamonds, or more complex shapes, that visually divides the panes of the insulating glazing unit into multiple smaller lites.

This disclosure relates to devices, systems, and techniques for fabricating muntin bar assemblies for insulating glazing units. In some examples, a muntin bar assembly is fabricated by loading a muntin bar fabrication machine with pieces of muntin bar stock. The muntin bar stock may be long sections of muntin bar from which individual muntin bars are cut and the muntin bar assembly subsequently fabricated therefrom. In some examples, the muntin bar fabrication machine is loaded with multiple different types of muntin bar stock, such as pieces of muntin bar stock that have different sizes, shapes, and/or colors from each other.

In operation, a computer associated with the muntin bar fabrication machine may receive a request to fabricate the individual pieces of muntin bar required to build a specific muntin bar assembly. In response to receiving the fabrication request, the muntin bar fabrication machine can extract a specific type of muntin stock corresponding to the muntin bar assembly being fabricated from the multiple different types of muntin bar stock loaded on the machine. The muntin bar fabrication machine can then process the extracted piece of muntin bar stock, e.g., by cutting one or more individual pieces of muntin bar from the longer piece of stock, notching and/or punching the individual pieces of muntin bar in locations needed to join the bars together to form an assembly, and/or shaping the ends of the individual pieces of muntin bar to join bars together in abutting arrangement.

Each muntin bar fabricated by the muntin bar fabrication machine may be discharged onto an adjacent assembly table. At the assembly table, an operator can take the pieces of muntin bar fabricated by the machine and associated with a particular muntin bar assembly being fabricated and join the pieces together to form the resulting assembly. For example, depending on the style of muntin bar assembly being fabricated, the operator may overlay corresponding notched sections of different muntin bars to form half-lap joins. As another example, the operator may insert joining keys into the end of a muntin bar and then insert the opposite end of the joining key into a hole or end of another muntin bar, thereby joining the muntin bars together with the joining key. The operator may assemble the muntin bar assembly by joining individual muntin bars pieces together in the order in which they are discharged from the muntin bar fabrication machine. The operator can quickly assembly different types of muntin bar assemblies as the muntin bar fabrication machine fabricates and discharges the individual pieces of muntin bar required for each particular type of muntin bar assembly.

FIG. 1 is a perspective view of an example system 10 for fabricating muntin bars. System 10 includes at least one muntin bar stock storage assembly 12, which is illustrated as a first muntin bar stock storage assembly 12A and a second muntin bar stock storage assembly 12B. The first muntin bar stock storage assembly 12A and second muntin bar stock storage assembly 12B can store different types of muntin bar stock for fabricating different types of muntin bar assemblies on demand. System 10 also includes an extraction device 14, feed device 16, cutting system 18, and a discharge table 20. Extraction device 14 can extract a desired one of the different types of muntin bar stock stored in first muntin bar stock storage assembly 12A and second muntin bar stock storage assembly 12B and convey the extracted piece of muntin bar stock to feed device 16. After depositing the extracted piece of muntin bar stock on feed device 16, the feed device can advance the piece of muntin bar stock into cutting system 18. Within cutting system 18, one or more cutting operations can be performed on the muntin bar stock to fabricate the individual pieces of muntin bar needed to build a specific muntin bar assembly. For example, cutting system 18 may initially cut and/or punch a terminal end of the muntin bar stock inserted into the system, make additional cuts and/or punches along the length of the stock as the stock is advanced lengthwise through the cutting system, and then make a terminal cut separating an individual muntin bar from a remainder of the muntin bar stock. The individual piece of muntin bar can be discharged from cutting system 18 on discharge table 20. An operator can combine multiple pieces of muntin bar together on discharge table 20 to form a resulting muntin bar assembly for incorporation into an IG unit.

As described in greater detail below, muntin bar fabrication system 10 may be used to efficiently produce a wide variety of different types of muntin bar assemblies without requiring extended downtime to change muntin bar stock, tooling, and other components needed to fabricate different muntin bar assemblies. When switching between production of different size (e.g., thickness) muntin bar assemblies without using system 10, an operator may be required to obtain different size muntin bar stock from a storage area, manually switch jigs and tooling with new jigs and tooling needed for the different size muntin bar stock, and otherwise take extended downtime when switching between production of different muntin bar assemblies. The amount of downtown increases as manufacturers and consumers increasing demand more customized muntin bar assembly products. With muntin bar fabrication system 10, however, the system can hold different types of muntin bar stock and also contain the various types of tooling needed to process each of the different types of muntin bar stock. Accordingly, muntin bar fabrication system 10 can automatically switch between different sources and/or types of muntin bar stock and the different tooling needed to process each type of muntin bar stock. This can allow system 10 to produce any type of muntin bar assembly desired by the manufacture and efficiently switch between production of different types of muntin bar assemblies.

In use, muntin bar fabrication system 10 can receive a request to fabricate a specific type of muntin bar assembly. In practice, the request will typically specify multiple muntin bar assemblies to be fabricated, each of which may be the same type (e.g., size, shape, color, and/or style) of muntin bar assembly or may be different types of muntin bar assemblies to be fabricated. The request may be received by a computer associated with the muntin bar fabrication system. For example, the request may be received when an operator inputs the request through a user interface 21 of the muntin bar fabrication system. Additionally or alternatively, the request may be received from a separate computer, such as a computer that controls production scheduling within the facility, via a wired or wireless connection. In response to receiving the request, the computer associated with muntin bar fabrication system 10 may determine the specific types of muntin bars needed and amount of each of these types to be produced for each particular muntin bar assembly (e.g., with reference to fabrication data stored in a memory associated with the computer). Thereafter, the computer associated with muntin bar fabrication system 10 can control the system to produce the specific muntin bars needed for each particular muntin bar assembly being fabricated.

Muntin bar fabrication system 10 can fabricate the individual pieces of muntin bar needed for building a muntin bar assembly. In response to receiving a request to fabricate a specific muntin bar assembly, system 10 can extract the piece(s) of muntin bar stock corresponding to the muntin bar assembly requested for construction from first muntin bar stock storage assembly 12A and/or second muntin bar stock storage assembly 12B. Each piece of muntin bar stock may be an elongated muntin bar that lacks the end cuts, punches, sizing, and/or shaping needed to provide an individual muntin bar used for building a muntin bar assembly. For example, muntin bar stock may have a length longer than any of the individual pieces of muntin bar subsequently used to build the muntin bar assembly. In some examples, each piece of muntin bar stock has a length ranging from 8 feet to 16 feet, such as 12 feet.

First muntin bar stock storage assembly 12A and second muntin bar stock storage assembly 12B can hold multiple different types of muntin bar stock. The muntin bar stock held in the storage assemblies may differ from each other by having different sizes (e.g., different widths to fit in different sized between-pane spaces), different colors, and/or different cross-sectional shapes. Depending on how the storage assemblies are loaded, the muntin bar stock within each muntin bar stock storage assembly may be of the same type, with different types held in different storage assemblies. Alternatively, at least one of the muntin bar stock storage assemblies may hold different types of muntin bar stock within that particular muntin bar stock storage assembly. Other loading configurations can be used without departing from the scope of the disclosure. For example, each of first muntin bar stock storage assembly 12A and second muntin bar stock storage assembly 12B may be loaded with the same type of muntin bar stock or only one of the muntin bar stock storage assemblies may be loaded with muntin bar stock (either all of the same type or of different types) while the other muntin bar stock storage assembly is unloaded.

Independent of the specific way in which first muntin bar stock storage assembly 12A and second muntin bar stock storage assembly 12B are loaded, configuring the muntin bar fabrication system 10 with multiple storage assemblies can be useful to facilitate efficient production of a wide range of different muntin bar assemblies. In practice, muntin bar fabrication system 10 may be used to produce a comparatively large number of muntin bar assemblies of a specific type (e.g., those corresponding to the highest volume fenestration products) and a comparatively smaller number of customized and non-standard muntin bar assemblies. To accommodate this range of production, muntin bar fabrication system 10 may be configured with at least one muntin bar stock storage assembly (e.g., first storage assembly 12A) that is manually loaded with muntin bar stock that is used in lower production volumes. Muntin bar fabrication system 10 may also be configured with at least one muntin bar stock storage assembly (e.g., second storage assembly 12B) that is preloaded with a larger volume of a particular type of muntin bar stock that is used in high production volumes.

Figure 2:
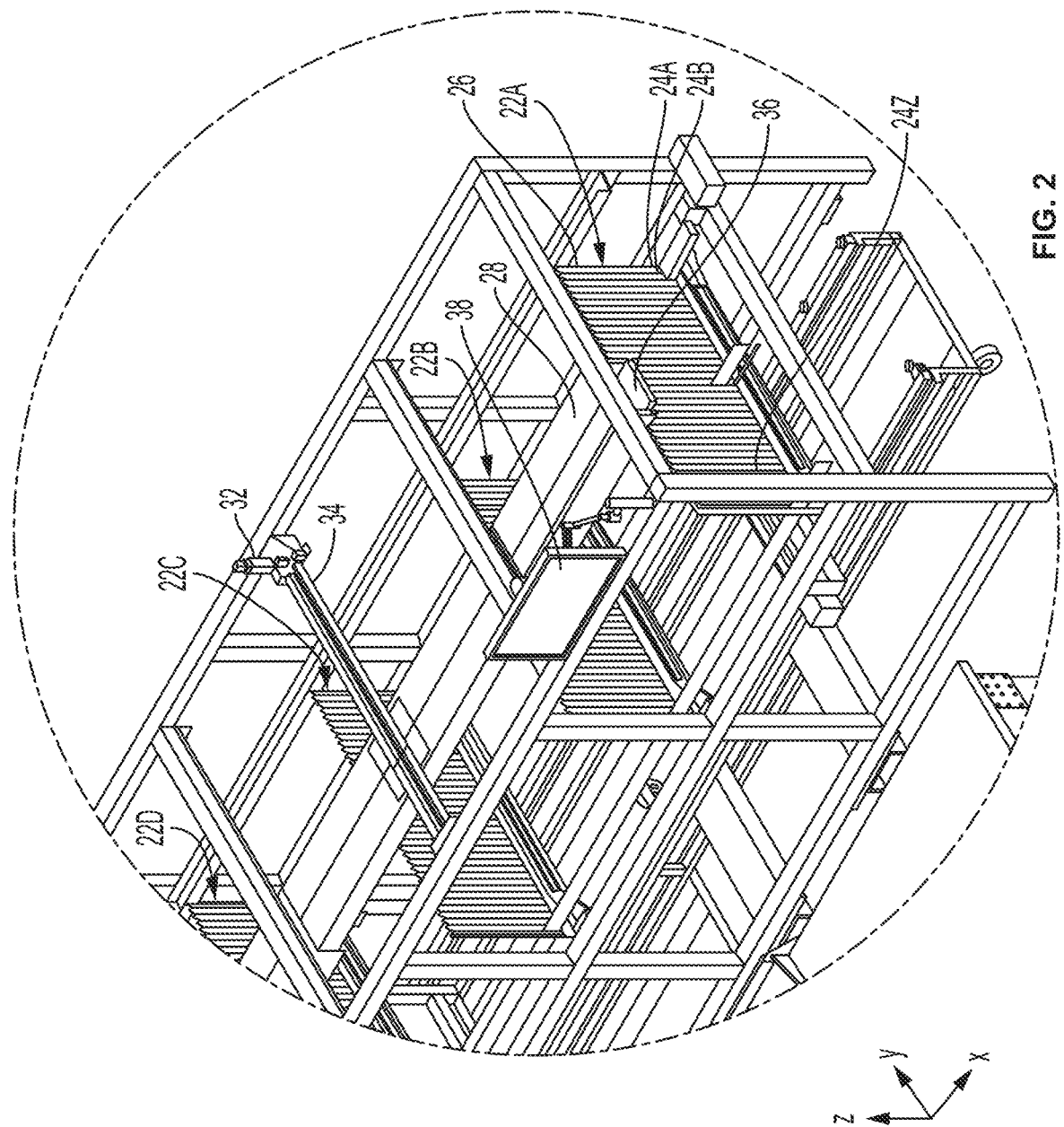
FIG. 2 is a detailed view of a portion of the example system of FIG. 1 taken along the A-sectional line shown on FIG. 1.

In the configuration of FIG. 1, muntin bar fabrication system 10 includes first muntin bar stock storage assembly 12A for holding muntin bar stock used in lower production volume muntin bar assemblies and second muntin bar stock storage assembly 12B used for holding muntin bar stock used in higher production volume muntin bar assemblies. FIG. 2 is a detailed view of first muntin bar stock storage assembly 12A taken along the A-sectional line shown on FIG. 1 and shows an example arrangement of components for the storage assembly.

As shown in the example of FIG. 2, first muntin bar stock storage assembly 12A includes multiple muntin bar holders 22A-22D (collectively "muntin bar holder 22") positioned at spaced apart positions along the length of muntin bar fabrication system 10 (e.g., in the X-direction indicated on FIGS. 1 and 2). Each muntin bar holder 22 can provide a physical platform that supports muntin bar stock inserted into the storage assembly and retains the muntin bar stock until extraction and use by the system. In the illustrated example, each muntin bar holder 22 has a plurality of laterally spaced apart receiving cavities 24A-24Z (collectively "receiving cavities 24"). Each receiving cavity 24 may be an opening sized to receive one or more types of muntin bar. Each receiving cavity 24 may be bounded by upright fingers 26 (e.g., extending vertically in the Z-direction indicated on FIG. 2), thereby forming adjacent cavities between adjacent upright fingers. In some examples, the upright fingers 26 can move laterally (e.g., in the Y-direction indicated on FIG. 2) to adjust the size of each receiving cavity 24, allowing larger or smaller sized muntin bar stock to be inserted into a particular receiving cavity as desired.

In use, an operator can load one or more of the receiving cavities 24 with muntin bar stock that is then subsequently extracted and used to form individual muntin bars. To load a receiving cavity 24, the operator may insert the terminal end of the piece of muntin bar stock into the outermost muntin bar holder 22A and then slide the muntin bar stock lengthwise into downstream muntin bar holders (e.g., in the negative X-direction indicated on FIG. 2). The operator can load multiple pieces of muntin bar stock into one receiving cavity 24, e.g., by inserting pieces of muntin bar stock one on top of another to form a vertical stack of muntin bar stock within the receiving cavity. Additionally or alternatively, the operator can load pieces of muntin bar stock into different receiving cavities 24 by inserting the pieces between different upright fingers 26.

In some configurations, including the configuration illustrated in FIG. 2, muntin bar fabrication system 10 includes a loading hopper 28 to help load receiving cavities 24. Instead of inserting muntin bar stock into a specific receiving cavity 24, an operator may insert the muntin bar stock into loading hopper 28. For example, the operator can insert the terminal end of a piece of muntin bar stock into open end 30 of loading hopper 28 and then push the muntin lengthwise into to loading hopper 28. Loading hopper 28 can translate laterally (e.g., in the positive and negative Y-directions indicated on FIG. 2) relative to receiving cavities 24. For example, loading hopper 28 can be connected to a motor 32 and drive belt 34 that operate to move loading hopper 28 laterally relative to the receiving cavities 24.

Operating under the control of the computer running muntin bar fabrication system 10, loading hopper 28 may translate to a particular receiving cavity 24 the computer designates for receiving the muntin bar stock inserted into the loading hopper. Upon translating to the designated receiving cavity 24, the computer can control loading hopper 28 to discharge the muntin bar stock inserted into the loading hopper into the designated receiving cavity 24. For example, the computer may cause loading hopper 28 or a portion thereof to open and/or tilt, causing the piece of muntin bar stock inserted into loading hopper 28 to fall out of the hopper and into the receiving cavity. In the configuration of FIG. 2, for example, loading hopper 28 has an opening 36 running along the length of the hopper through which a piece of muntin bar stock can be discharged.

In some applications, the computer controlling muntin bar fabrication system 10 provides instructions to the operator indicating which specific type of muntin bar stock should be loaded into loading hopper 28. For example, the computer may control display 38 to display information to the operator indicating the type of muntin bar stock that should be inserted into loading hopper 28. The system can include one or more sensors (e.g., one or more optical sensors) that compare the type of muntin bar stock loaded into loading hopper 28 with the type instructed by the computer to be loaded and, if there is a discrepancy, provide a warning on display 38 and/or prohibit discharge of the muntin bar stock into the designated receiving cavity 24. By loading receiving cavities 24 in response to instructions displayed on display 38, the computer controlling muntin bar fabrication system 10 may store information noting the particular type of muntin bar stock within each receiving cavity 24 and at each vertical position of a given receiving cavity. The computer can use this information when subsequently controlling the muntin bar fabrication system 10 to extract a desired type of muntin bar stock.

As discussed above with respect to FIG. 1, muntin bar fabrication system 10 also includes a second muntin bar stock storage assembly 12B. The second muntin bar stock storage assembly 12B can, but need not, be loaded with muntin bar stock used in higher production volume muntin bar assemblies. For example, the second bar stock storage assembly 12B may be configured to receive a container containing a plurality of pieces of muntin bar stock. The container can be a modular structure that can be inserted into muntin bar fabrication system (e.g., full of muntin bar stock) and withdrawn from the structure (e.g., after have been exhausted of muntin bar stock). This allows second muntin bar stock storage assembly 12B to be loaded in bulk with fresh muntin bar stock each time a container is replaced.

Figure 3:
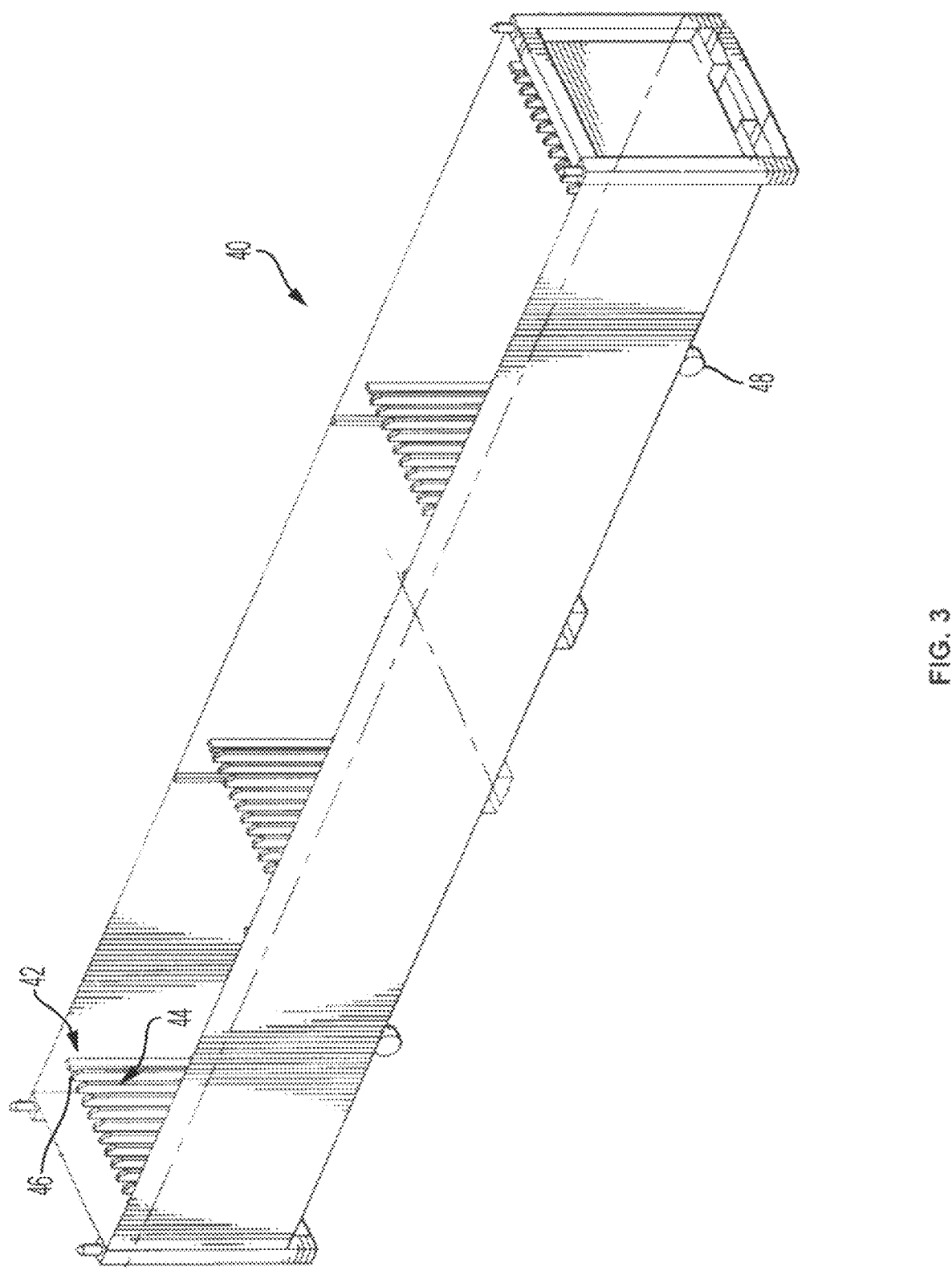
FIG. 3 is a perspective view of an example container that can contain muntin bar stock and that can be inserted into the system for fabricating muntin bars shown on FIG. 1.

FIG. 3 is a perspective view of an example container 40 that can contain muntin bar stock and that can be inserted into second muntin bar stock storage assembly 12B. In this example, container 40 has a plurality of muntin bar holders 42 positioned at spaced apart positions along the length of the container. Each muntin bar holder 42 has a plurality of laterally spaced apart receiving cavities 44, which can be openings sized to receive one or more types of muntin bar. Further each receiving cavity 44 may be bounded by upright fingers or muntin bar locating members 46. In some example, container 40 includes wheels 48 that allow the container to be rolled into/out of second muntin bar stock storage assembly 12B. Example configurations of container 40 are described in U.S. Pat. No. 6,591,988, the contents of which are incorporated herein by reference.

In practice, muntin bar stock can be loaded in vertical stacks within each receiving cavity 44. Typically, container 40 is loaded with the same type of muntin bar stock with each receiving cavity, although different types of muntin bar stock can be loaded into different receiving cavities. In either case, the entire container 40 can be inserted into muntin bar fabrication system 10 to load the second muntin bar stock storage assembly 12B of the system. For example, with reference to FIG. 1, container 40 can be inserted through a container receiving channel 41 and advanced lengthwise through system 10 until the container is positioned in front of first muntin bar stock storage assembly 12A.

In some configurations, muntin bar fabrication system 10 can receive and hold multiple containers 40 of muntin bar stock, each which may contain the same type of muntin bar stock or which may contain different types of muntin bar stock. For example, muntin bar fabrication system 10 in FIG. 1 is designed to hold three containers 40 of muntin bar stock (only one of which is shown in the figure). The containers can be positioned side-by-side (e.g., in the Y-direction indicated on FIG. 1) to provide multiple, laterally spaced apart containers positioned in side-by-side arrangement. In different examples, muntin bar fabrication system 10 can hold more containers 40 of muntin bar stock (e.g., four, five, or more) or few containers (e.g., two or one), and the disclosure is not limited in this respect. Moreover, although muntin bar fabrication system 10 includes both a first muntin bar stock storage assembly 12A and a second muntin bar stock storage assembly 12B, the system may not include both stock storage assemblies but may instead only have a single stock storage assembly (e.g., either the first storage assembly 12A or the second storage assembly 12B).

As briefly discussed above, muntin bar fabrication system 10 includes extraction device 14. Extraction device 14 can extract a desired one of the different types of muntin bar stock stored in first muntin bar stock storage assembly 12A and second muntin bar stock storage assembly 12B and convey the extracted piece of muntin bar stock to feed device 16. The computer controlling muntin bar fabrication system 10 can determine which type of muntin bar to extract and location of that particular type of muntin bar stock within first muntin bar stock storage assembly 12A or second muntin bar stock storage assembly 12B, e.g., based on the type of muntin bar assembly requested for fabrication and information stored in the memory of the computer. In response to receiving the request and determining the location of the particular type of muntin bar stock within the storage assemblies, the computer can control extraction device 14 to move the extraction device to appropriate location where the muntin bar stock is located and cause the extraction device to extract the muntin bar stock from the storage assembly. Depending on the configuration of extraction device 14 and first muntin bar stock storage assembly 12A or second muntin bar stock storage assembly 12B, the extraction device may or may not extract the muntin bar stock directly from the storage assembly.

For example, in the configuration of FIG. 1, muntin bar fabrication system 10 includes a bar pull mechanism 50 that is configured to pull a selected piece of muntin bar stock out of first muntin bar stock storage assembly 12A. Bar pull mechanism 50 can translate longitudinally (e.g., in the X-direction indicated on FIG. 1) to pull the piece of muntin bar stock longitudinally out of first muntin bar stock storage assembly 12A. For example, bar pull mechanism 50 can pull a piece of muntin bar stock longitudinally out of an opposite end of first muntin bar stock storage assembly 12A from the end in which the muntin bar stock was inserted into the storage assembly. In addition, bar pull mechanism 50 may translate laterally (e.g., in the Y-direction indicated on FIG. 1) to move to a particular lateral receiving cavity 24 (FIG. 2) from which to extract a piece of muntin bar stock.

Figure 4:
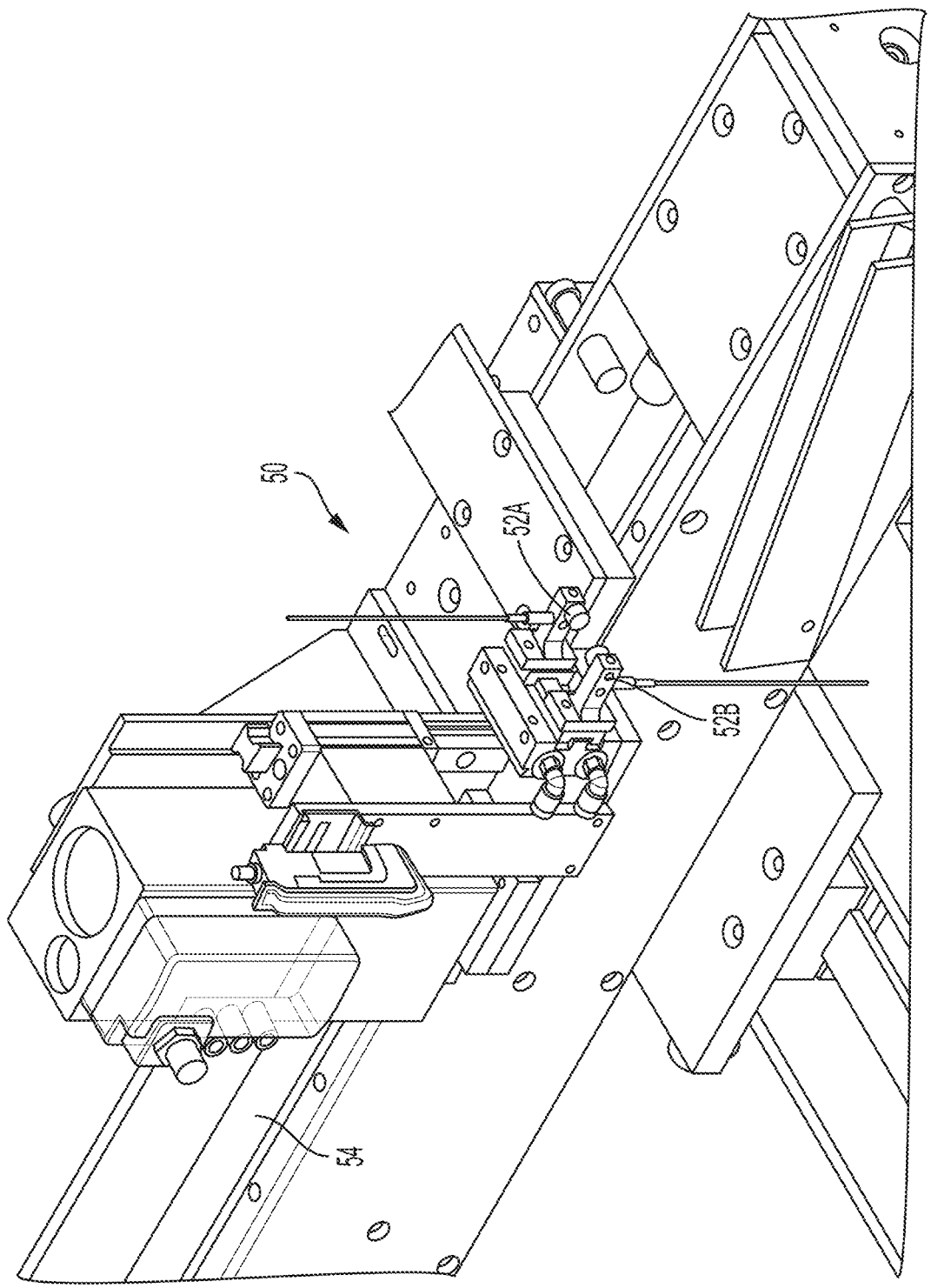
FIG. 4 is a detailed view of an example bar pull mechanism that can be used on the system of FIG. 1.

FIG. 4 is a detailed view of bar pull mechanism 50 showing an example arrangement of components for the bar pull mechanism. In this example, bar pull mechanism 50 includes a pair of fingers or grasping members 52A, 52B that move relative to each other to grasp a piece of muntin bar stock therebetween. Bar pull mechanism 50 also includes a conveyer belt 54 operatively coupled to the fingers or grasping members 52A, 52B. In operation, conveyor belt 54 can drive the fingers or grasping members 52A, 52B from a first end where the bar pull mechanism 50 is positioned in FIG. 1 to a second end at or adjacent first muntin bar stock assembly 12A. For example, conveyor belt 54 can drive the fingers or grasping members 52A, 52B until that are positioned around the terminal end of a piece of muntin bar stock projecting from first muntin bar stock assembly 12A. After closing the fingers together to grasp the piece of muntin bar stock, conveyor belt 54 can translate in the opposite direction. This causes the fingers or grasping members 52A, 52B and muntin bar stock retained therebetween to translate from the second end of the bar pull mechanism 50 at or adjacent first muntin bar stock assembly 12A to the first end where the bar pull mechanism 50 is positioned in FIG. 1.

After bar pull mechanism 50 withdraws a piece of muntin bar stock from first muntin bar stock storage assembly 12A, extraction device 14 can extract the piece muntin bar stock from the bar pull assembly and transport it to bar feed device 16. Alternatively, in instances where extraction device 14 is withdrawing a piece of muntin bar stock from second muntin bar stock storage assembly 12B, the extraction device extract the muntin bar stock directly from container 40 (FIG. 3) without first engaging bar pull mechanism 50.

Figure 5:
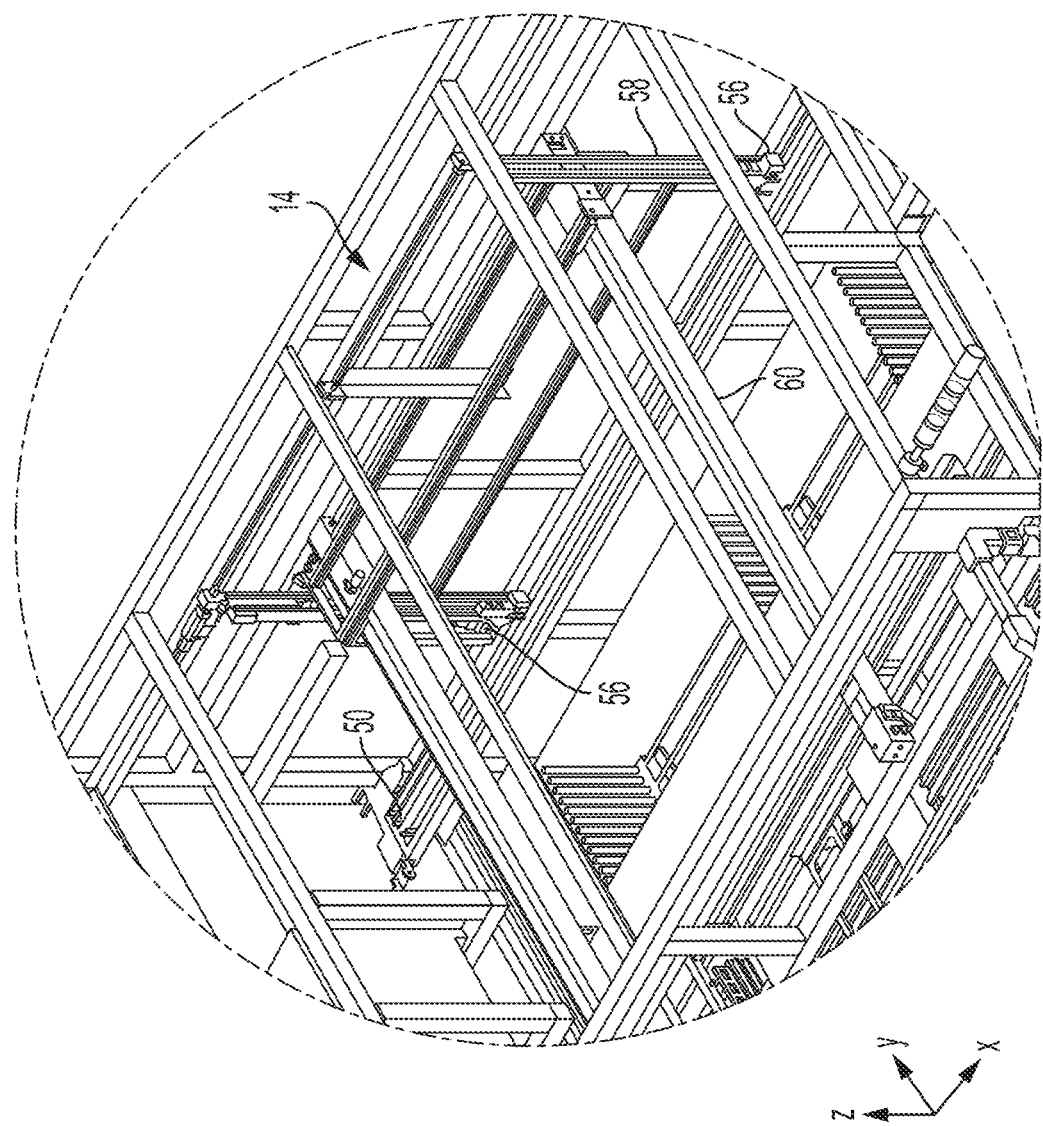
FIG. 5 is a detailed view of a portion of the example system of FIG. 1 taken along the B-sectional line shown on FIG. 1.

FIG. 5 is a detailed view of a portion of muntin bar fabrication system 10 taken along the B-sectional line shown on FIG. 1 and shows an example configuration of extraction device 14. In this example, extraction device 14 includes at least one extraction head 56 (which is illustrated as two extraction heads), a vertical conveyance support member 58, and a horizontal conveyance support member 60. In operation, extraction head 56 can translate laterally (e.g., in the Y-direction indicated on FIG. 5) along horizontal conveyance support members 60 to a lateral location where a piece of muntin bar stock to be extracted resides. In instances where the piece of muntin bar stock is first extracted from first muntin bar stock assembly 12A by bar pull mechanism 50, extraction head 56 can translate laterally to bar pull mechanism 50. By contract, in instances where the piece of muntin bar stock to be extracted is located in a container 40 of second bar stock storage assembly 12B, extraction head 56 can translate laterally to a specific receiving cavity of a specific container 40 from which the muntin bar stock is to be extracted.

Upon being positioned at the lateral location corresponding to the muntin bar stock to be extracted, extraction head 56 can vertically lower along vertical conveyance support member 58 until the extraction head is positioned about the piece of muntin bar stock to be extracted. After the extraction head grasps the piece of muntin bar stock to be extracted, the extraction head can vertically raise along vertical conveyance support member 58, e.g., until the muntin bar stock is clear of bar pull mechanism 50 or container 40 for lateral transport. Thereafter, extraction head 56 can translate laterally along horizontal conveyance support members 60 to a lateral location where bar feed device 16 is positioned, thereafter lowering and depositing the muntin bar stock on the bar feed mechanism. In configurations where extraction device 14 is positioned over the muntin bar stock and can translate both vertically and horizontally, the extraction device may be characterized as an overhead pick and place assembly.

Figure 6:
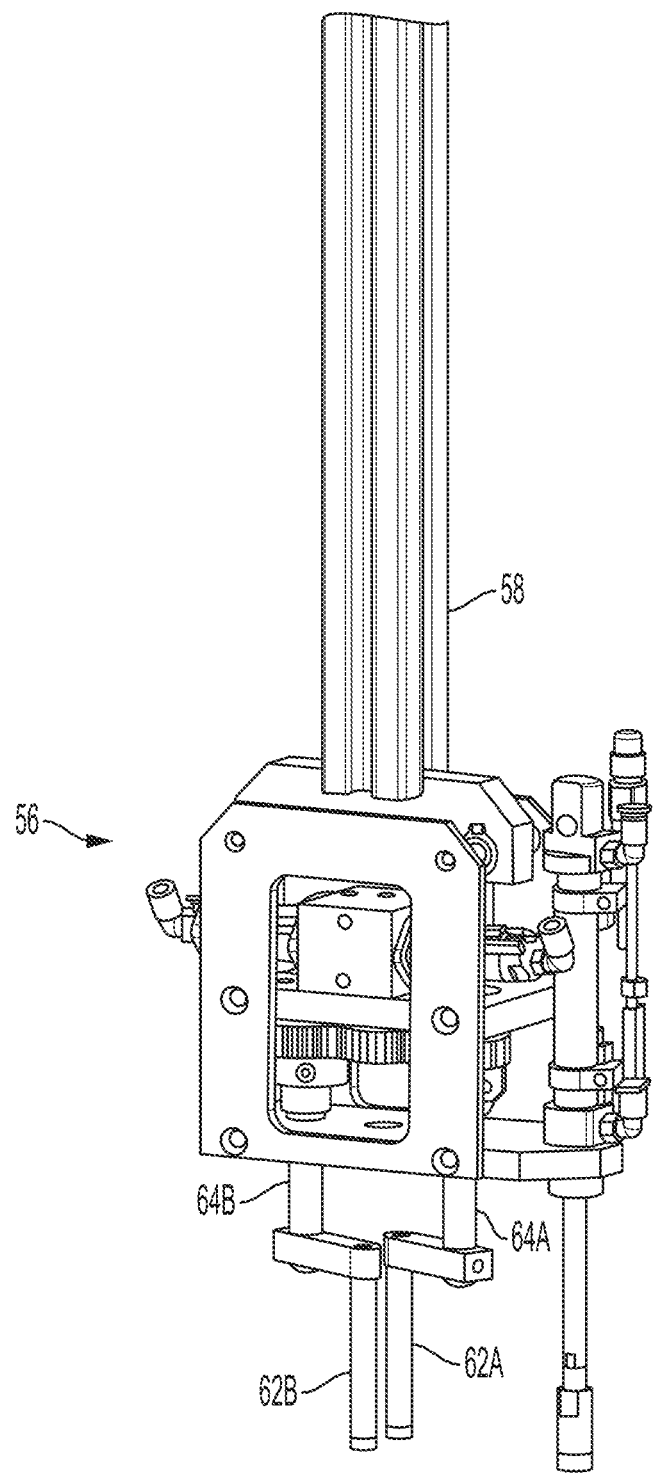
FIG. 6 is an illustration of one example configuration of an extraction head that can be used on an extraction device in the system of FIG. 1.

Extraction head 56 of extraction device 14 can have a number of different configurations. FIG. 6 is an illustration of one example configuration of extraction head 56. In this example, extraction head 56 is slidably mounted on vertical conveyance support member 58. In addition, extraction head 56 includes a pair of fingers or grasping members 62A, 62B that move relative to each other to grasp a piece of muntin bar stock therebetween. In particular, grasping members 62A, 62B rotate via drive pins 64A, 64B, respectively, to open and close the gap between the grasping members. After extraction head 56 grasps a particular piece of muntin bar stock between grasping members 62A, 62B, the extraction head can translate over to bar feed device 16 and release the muntin bar stock in the bar feed mechanism.

Figure 7:
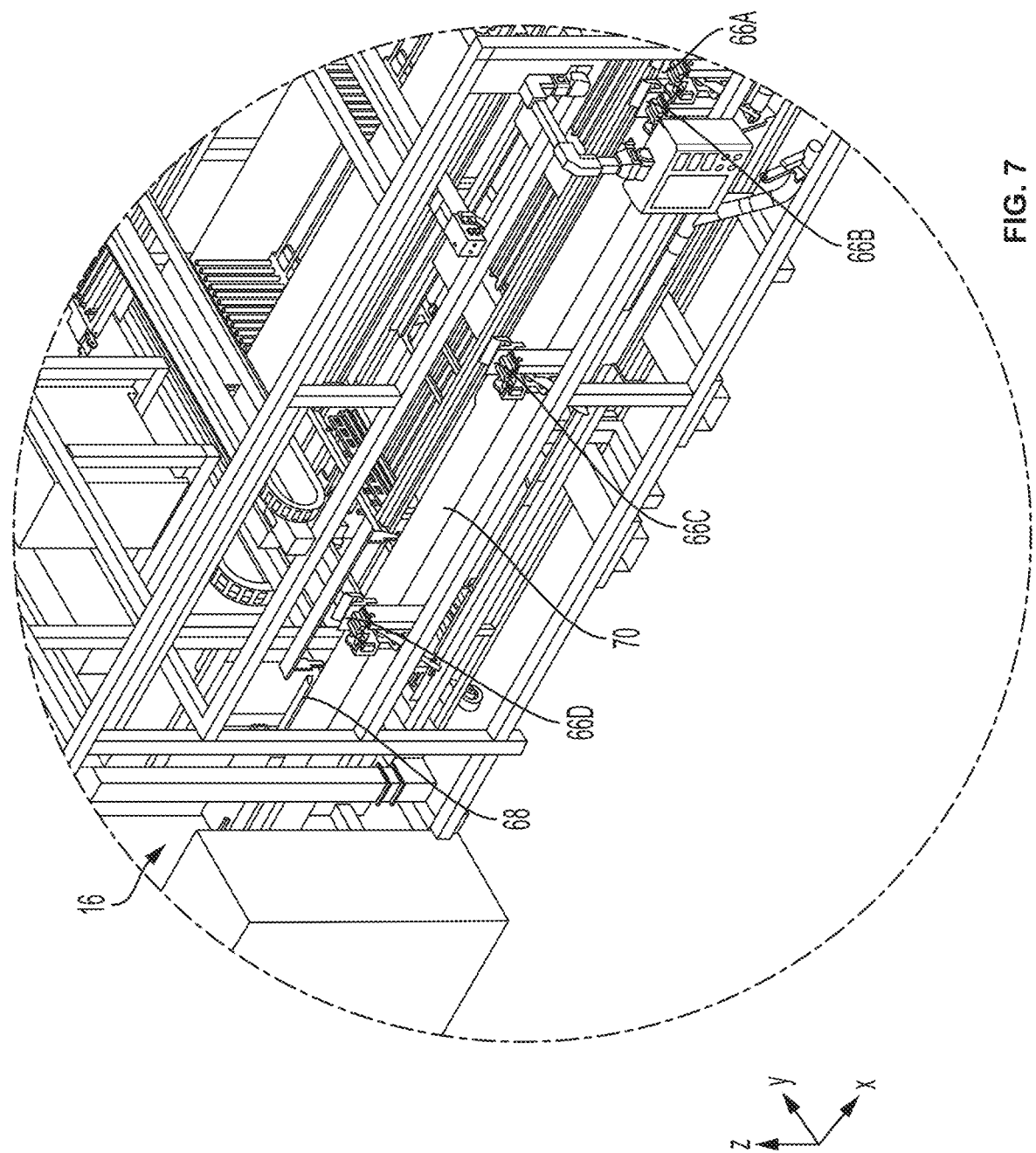
FIG. 7 is a detailed view of a portion of the example system of FIG. 1 taken along the C-sectional line shown on FIG. 1.

FIG. 7 is a detailed view of a portion of muntin bar fabrication system 10 taken along the C-sectional line shown on FIG. 1 and shows an example arrangement of bar feed device 16. In this example, bar feed device 16 includes multiple muntin bar stock receiving supports 66A-66D (collectively "receiving supports 66") arranged at spaced apart locations along the length of muntin bar fabrication system 10 (e.g., in the X-direction indicated on FIG. 7). Muntin bar feed device 16 also includes a pushing member 68 that can translate longitudinally (e.g., in the positive and negative X-direction indicated on FIG. 7) to feed a piece of muntin bar stock into cutting system 18. In some configurations, receiving supports 66 are positioned at fixed locations such that pushing member 68 moves relative to the receiving supports. In other configurations, one or more receiving supports 66 (e.g., all of the receiving supports) move longitudinally simultaneously and/or in conjunction with pushing member 68.

In operation, extraction device 14 (FIG. 1) can translate over to muntin bar feed device 16 and deposit an extracted piece of muntin bar stock in the feed mechanism. For example, extraction device 14 can release a piece of muntin bar stock, causing the piece of muntin bar stock to fall into receiving supports 66. In some examples, opposed faces of receiving supports 66 translate laterally (e.g., in the positive and negative Y-direction indicated on FIG. 7), thereby opening to provide an enlarged space for receiving an extracted muntin bar feed stock and closing to reorient the feed stock. For example, receiving supports 66 may have opposed faces that are contoured or angled such that, when the opposed faces of the receiving support are brought together, the width of the muntin bar stock reorients from being parallel to gravity (e.g., the Z-direction indicated on FIG. 7) to perpendicular to gravity. Reorienting the muntin bar stock can prepare the stock for insertion into cutting system 18.

To feed muntin bar stock into cutting system 18, bar feed mechanism may include pushing member 68. In some examples, pushing member 68 includes a pair of fingers or grasping members that move relative to each other to grasp a terminal end of a piece of muntin bar stock positioned in bar feed device 16. In other examples, pushing member 68 does not includes grasping members but may instead include a pushing surface that bears against the terminal end of the muntin bar stock without grasping the stock. In either configuration, pushing member 68 may be operatively connected to a conveyor belt 70. Conveyor belt 70 can drive the pushing member 68 longitudinally to feed the muntin bar stock into the cutting system.

For example, while pushing member 68 grasps one terminal end of the muntin bar feed stock, conveyor belt 70 may drive forward (e.g., in the positive X-direction indicated on FIG. 7), advancing the opposite terminal end of the feed stock into cutting system 18. Opposed faces of receiving supports 66 can translate apart to allow the muntin bar feed stock to translate through the receiving supports. Additionally or alternatively, the opposed faces of receiving supports 66 may fall away as pushing member 68 approaches the faces. For example, the opposed faces of receiving supports 66 may rotate and/or reorient to be positioned in a different plane than the plane pushing member 68 travels through. This can allow pushing member 68 to travel through the space previously occupied by the opposed faces without contacting them.

The distance bar feed device 16 pushes the piece of muntin bar feedstock into cutting system 18 can vary, e.g., based on the size of the piece of muntin bar stock and the cutting operation(s) being performed. Typically, bar feed device 16 will progressively and discontinuously push the piece of muntin bar stock into cutting system 18. For example, bar feed device 16 may push the piece of muntin bar stock into cutting system 18 a first distance, e.g., such that a first terminal end of the muntin bar stock is positioned inside of the cutting system. Bar feed device 16 may then cease pushing the piece of muntin bar stock while cutting system 18 performs one or more cutting operations on the terminal end of the stock. Thereafter, bar feed device 16 may push the piece of muntin bar stock into cutting system 18 a second distance greater than the first distance, e.g., such that the first terminal end of the muntin bar stock is pushed beyond the cutting system and an intermediate section of the stock is positioned in the cutting system. Bar feed device 16 may then cease pushing the piece of muntin bar stock while cutting system 18 performs one or more cutting operations on the intermediate section of the stock. Thereafter, bar feed device 16 may push the piece of muntin bar stock into cutting system 18 a third distance greater than the second distance, e.g., such that a different intermediate section of the muntin bar stock or a second terminal end of the stock is positioned inside of the cutting mechanism. Bar feed device 16 may then cease pushing the piece of muntin bar stock while cutting system 18 performs one or more cutting operations, e.g., on the second terminal end or cutting the intermediate transversely to form a second terminal end for the muntin bar being produced.

To help ensure efficient operation of muntin bar fabrication system 10, the system may include one or more sensors that monitor operation of the various features of the system and provide control feedback. In some examples, system 10 includes a sensor (e.g., optical sensor) that evaluates the piece of muntin bar stock loaded into bar feed device 16, e.g., to ensure that the muntin bar stock in properly oriented before being fed into cutting system 18. In practice, some types of muntin bar stock are two-tone, meaning that it has one color on one side and a different color on a different side. Muntin bar assemblies produced using this type of stock can be used on fenestration products that have an interior color that is different than the exterior color, e.g., such that the interior-facing side of the muntin bar assembly matches the interior color of the fenestration product and the exterior-facing side of the muntin bar assembly matches the exterior color of the fenestration product.

By configuration muntin bar fabrication system 10 with a sensor, the sensor can check the color orientation of the muntin bar stock (e.g., to determine which color is facing in the positive Y-direction in FIG. 7 and which color is facing in the negative Y-direction in FIG. 7). By comparing the color information measured by the sensor with information stored in memory, the system can determine if the piece of muntin bar stock is properly oriented or, alternatively, if the muntin bar stock needs to be rotated 180 degrees to switch the colored sides relative to tools within cutting system 18.

In some examples, system 10 issues a notification (e.g., audible, visual) instructing an operator to manually rotate the piece of muntin bar stock upon determining that it needs to be rotated 180 degrees. In other examples, system 10 automatically grasps and rotates the piece of muntin bar stock 180 degrees upon determining that it needs to be rotated 180 degrees. In one configuration according to this latter example, bar pull mechanism 50 grasps a terminal end of the piece of muntin bar stock and rotates 180 degrees to switch the orientation of the colored sides of the stock. In other configuration according to this example, system 10 includes a rotating element (e.g., positioned adjacent cutting system 18) that grasps the terminal end of the muntin bar stock opposite bar pull mechanism 50 and rotates 180 degrees to switch the orientation of the colored sides of the stock.

With further reference to FIG. 1, muntin bar fabrication system 10 includes cutting system 18. Cutting system 18 may be a stationary unit within fabrication system 10 that receives muntin bar stock (e.g., by having bar feed device 16 push the stock into and/or through the unit). Within the unit, cutting system 18 can perform one or more cutting operations on the muntin bar stock, thereby transforming the stock into one or more individual pieces of muntin bar.

Figure 8:
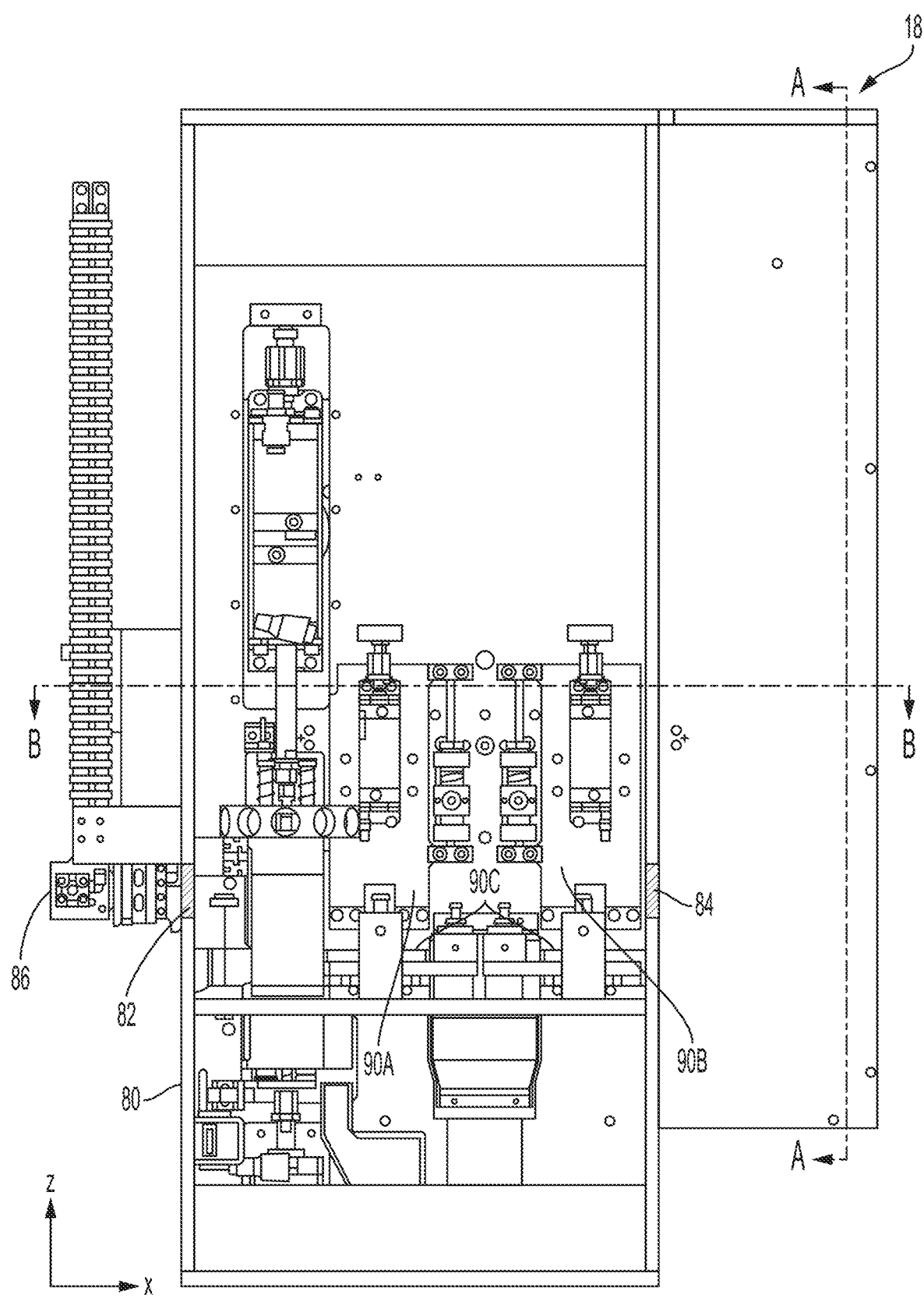
FIG. 8 is a side view of an example cutting system that can be used on the example system of FIG. 1.
Figure 9:
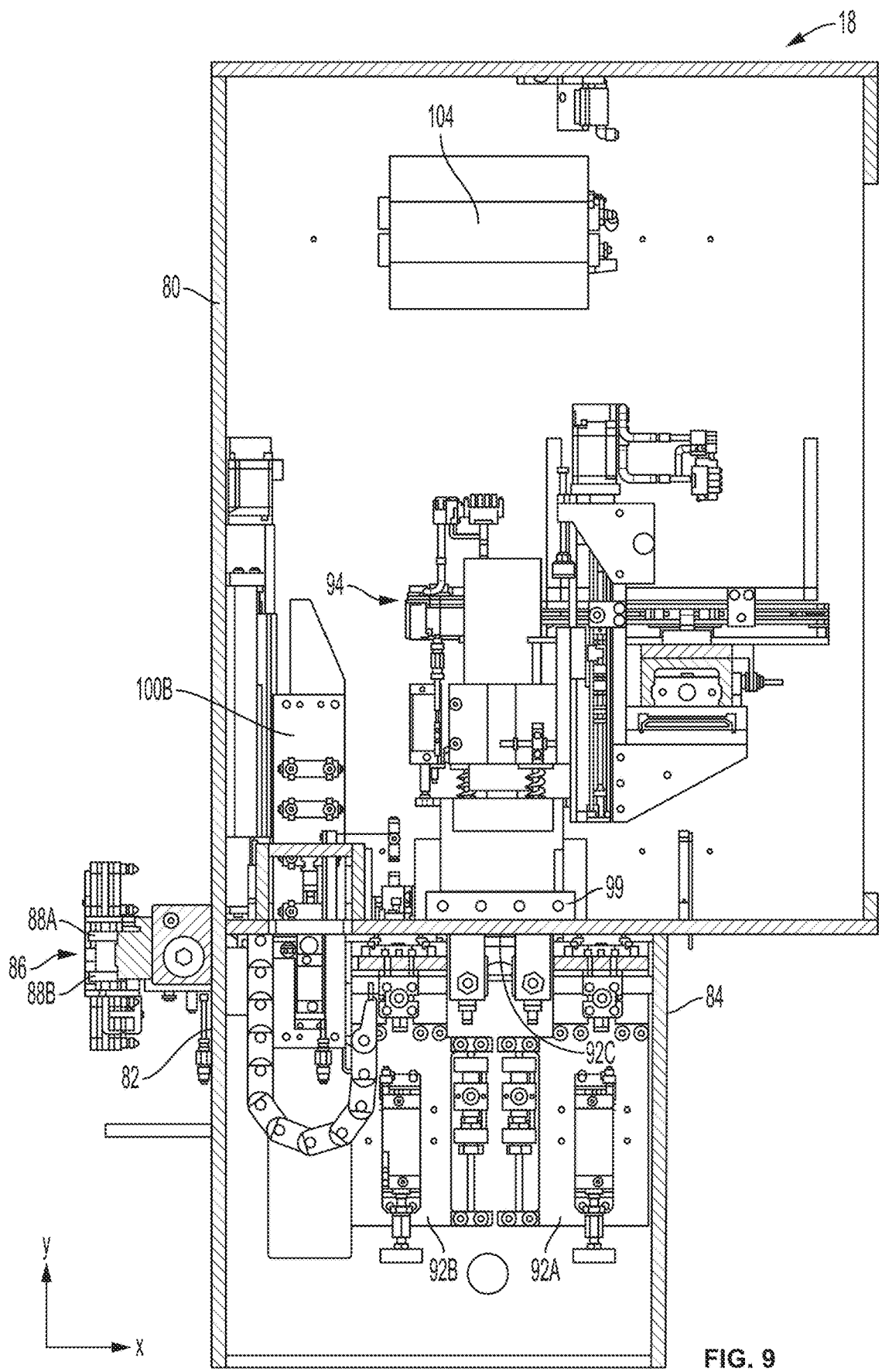
FIG. 9 is a top view of the example cutting system of FIG. 8 taken along the B-B line shown on FIG. 8.
Figure 10:
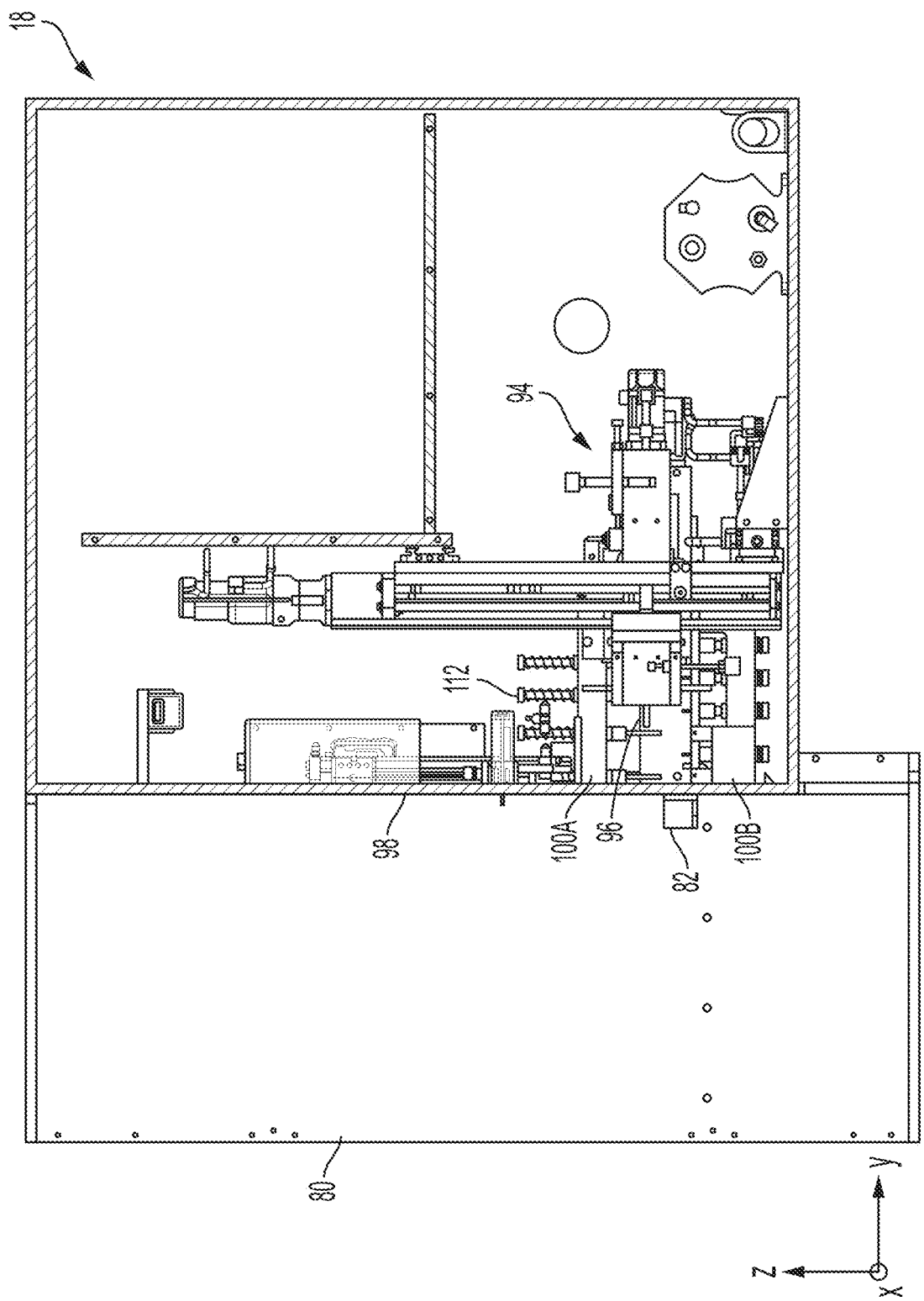
FIG. 10 is a side view of the example cutting system of FIG. 8 taken along the A-A line shown on FIG. 8.

FIGS. 8-10 are different views of an example configuration of a cutting system that can be used as cutting system 18 in muntin bar fabrication system 10. FIG. 8 is a side view of the example cutting system. FIG. 9 is a top view of the example cutting system taken along the B-B line shown on FIG. 8. FIG. 10 is a side view of the example cutting system of taken along the A-A line shown on FIG. 8.

As shown in the illustrated example, cutting system 18 includes a housing 80 that has an inlet 82 and an outlet 84. Housing 80 may form a bounded chamber that contains cutting tools and that helps prevent cutting debris from discharging from the cutting system during cutting operations. In operation, bar feed device 16 (FIG. 7) pushes a piece of muntin bar stock through inlet 82, whereupon one or more cutting operations can be performed on the bar stock within housing 80. After performing any desired cutting operations on the muntin bar stock to form a resulting piece of muntin bar, bar feed device 16 pushes the muntin bar out of housing 80 through outlet 84. Bar feed device 16 can push the muntin bar out of housing 80 through outlet 84 by pushing a trailing piece of muntin bar stock. As the leading end of the muntin bar stock pushed by bar feed device 16 bears against the trailing end of the muntin bar inside of housing 80, the muntin bar can be pushed farther into and through the housing. In other examples, cutting system 18 may include a separate conveyance system (e.g., drive belt) that controls movement of the muntin bar stock and resulting muntin bar within and through housing 80.

Cutting system 18 can perform one or more cutting operations on the piece of muntin bar stock inserted into housing 80. Before performing the cutting operations, the piece of muntin bar stock intended to be inserted into the housing may be rotated 180 degrees to reorient the stock, as discussed above. In the example of FIGS. 8-10, a muntin bar stock reorientation device 86 is mounted upstream of inlet opening 82. Muntin bar stock reorientation device 86 includes a pair of fingers 88A, 88B that are mounted on a rotatable chassis. The pair of fingers 88A, 88B can grasp a terminal end of the piece of muntin bar stock and rotate 180 degrees to switch the orientation of the stock before the piece of muntin bar stock is subsequently pushed through inlet 82 and into housing 80.

Inside of housing 80, cutting system 18 may include one or more clamping devices. The clamping devices can clamp onto the muntin bar stock inserted into the housing, providing a clamped section of muntin bar stock upon which a cutting operation can be performed. For example, the cutting operation can be performed directly on the clamped section of muntin bar stock (e.g., a section of the bar stock held between opposed clamping jaws) and/or adjacent to the clamped section of muntin bar stock (e.g., upstream or downstream of a section of the bar stock held between opposed clamping jaws). Clamping the muntin bar stock helps prevent the stock from moving during the cutting operation, helping to provide a clean, high-quality cut.

In the configuration of FIGS. 8-10, cutting system 18 includes at least one pair of jaws, which is shown as a first pair of jaws 90A-90C (collectively "jaws 90") and a second pair of jaws 92A-92C (collectively "jaws 92"). Each pair of jaws may provide opposed surfaces configured to bear against a piece of muntin bar stock inserted into housing 80, preventing the piece of muntin bar stock from moving between the jaws when in a clamped position. In the illustrated example, the first pair of jaws 90 is configured to clamp a piece of inserted muntin bar stock in a generally vertical direction. The first pair of jaws 90 includes a split upper jaw member 90A, 90B and a lower jaw member 90C positioned below the upper jaw member. The lower jaw member 90C is illustrated as a flat surface that split upper jaw member 90A, 90B presses a muntin bar against. The upper jaw member 90A, 90B and lower jaw member 90C are configured to move towards and away from each other to clamp top and bottom edges of a piece of muntin bar stock or release the edges, respectively. For example, the upper jaw member 90A, 90B may move vertically downwardly to press against a top surface of a piece of muntin bar stock inserted into housing while lower jaw member 90C remains stationary, causing the lower jaw member 90C to press against a bottom surface of the piece of muntin bar stock. In other configurations, both jaw members (e.g., the upper jaw member and the lower jaw member) may move to clamp and release a muntin bar between the jaws.

The second pair of jaws 92 is configured to clamp a piece of inserted muntin bar stock in a generally horizontal direction. The second pair of jaws 92 includes a split jaw member 92A, 92B and a unitary opposed jaw member 92C positioned opposite the split jaw member. The opposed jaw member 92C is illustrated as a flat surface that split jaw member 92A, 92B presses a muntin bar against. The split jaw member 92A, 92B and unitary jaw member 92C are configured to move towards and away from each other to clamp side edges of a piece of muntin bar stock or release the edges, respectively. For example, the split jaw member 92A, 92B may move laterally to press against a side surface of a piece of muntin bar stock inserted into housing while unitary jaw member 92C remains stationary, causing the unity jaw member 92C to press against an opposite side surface of the piece of muntin bar stock. In other configurations, both jaw members may move to clamp and release a muntin bar between the jaws. In addition, although the illustrated example includes two pairs of jaws 90, 92, in other examples, the system can include more pairs of jaws or fewer pairs of jaws (e.g., one or none).

To perform cutting operations, cutting system 18 can include a cutter. The cutter can move relative to the piece of muntin bar stock positioned within housing 80 to perform a cutting operation on the muntin bar stock. In some examples, the cutter is only configured to move in a single axis (e.g., to make a transverse cut). In other examples, the cutter is a multi-axis cutter that can move along multiple axes. For example, the cutter may be a three-axis cutter that can move in each of the X-direction, Y-direction, and Z-direction indicated on FIGS. 8-10. Configuring cutting system 18 with a multi-axis cutter can be useful to enable the system to make a wide variety of different cuts, allowing the system to fabricate muntin bars suitable for a wide variety of different muntin bar assemblies.

In the example of FIGS. 8-10, cutting system 18 includes cutter 94. In different examples, cutter 94 may be implemented as a blade, a router, a laser, or other suitable feature that can cut muntin bar stock. In the illustrated example, however, cutter 94 is shown as a spindle motor that carries an end mill 96, which is a milling bit that can generally cut in all directions. As perhaps best seen in FIG. 10 (which does not show clamping jaws 90, 92 and related hardware for sake of clarity), cutter 94 is positioned behind a divider wall 98 inside of housing 80 and configured to move through an opening in the divider wall (e.g., in the Y-direction indicated on FIG. 10) to work on a piece of muntin bar stock inserted into the housing. Cutter 94 can further move vertically (e.g., in the Z-direction indicated on FIG. 10) and longitudinally (e.g., in the X-direction indicated on FIG. 10) to cut along the length, width, and height of a piece of muntin bar stock. This configuration provides a three-axis rotary cutter for performing cutting operations on a piece of muntin bar stock, although other configurations can be used.

Because different types of cutters may be required when processing different types of muntin bar stock, cutting system 18 may include multiple cutters and/or interchangeable cutting heads to provide flexibility for processing a wide variety of different muntin bar stock. In the illustrated configuration, cutting system 18 includes a tool holding block 99 (FIG. 9) that is configured to hold a plurality of cutting heads. For example, tool holding block 99 can hold multiple end mills 96 that have different cutting configurations from one another (e.g., different sizes, different shapes, right-hand versus left-hand cutting geometry). In operation, the computer controlling cutting system 18 can control cutter 94 to deposit a cutting head currently held by the cutter in tool holding block 99 and withdraw a new tool from the tool holding block specifically selected for the type of muntin bar stock being processed. The computer can control cutter 94 to change the cutting head as needed, for example, as the cutter switches between cuts on a specific piece of muntin bar stock, as the cutter switches to performing a cutting operation on a new type of muntin bar stock, when the computer determines that the cutting head is becoming dull, or the like.

In addition to or in lieu of cutter 94, cutting system 18 can include one or more punches. The punches may be mechanical cutting punches that have a sharpened leading edge configured to cut into a piece of muntin bar stock. Driving a punch into the muntin bar stock can cause the leading edge of the punch to pierce the muntin bar stock. Depending on the orientation of the punch relative to the muntin bar and the configuration of the punch used, the punch may form a hole in the muntin bar stock (e.g., for inserting a joining key) or may remove an entire section of the muntin bar stock (e.g., forming a notch to provide a half-lap joint). Thus, the punch can perform a cutting operation by forming a hole in the muntin bar stock and/or removing a section of the muntin bar stock.

To provide flexibility for processing a variety of different types of muntin bar stock, cutting system 18 in FIGS. 8-10 includes at least one array of punches 100, which is shown as being implemented as a first set of punches 100A and a second set of punches 100B (collectively "punches 100") (FIG. 10). The punches 100 are positioned behind divider wall 98 inside of housing 80 and configured to move through respective openings in the divider wall (e.g., in the Y-direction indicated on FIG. 10) to access the piece of muntin bar stock inserted into the housing. The first set of punches 100A are positioned at a location vertically above the piece of muntin bar stock, when the stock is inserted into housing 80. The second set of punches 100B are positioned at a location vertically below the piece of muntin bar stock. Each set of punches 100 comprises a plurality of different punches 102, which may differ from one another by being different sizes and/or different shapes.

In operation, the computer controlling cutting system 18 can select a specific punch 102 from the first set of punches 100A and/or the second set of punches 100B for engaging. The computer can select the punch(es) based on the specific type of muntin bar stock being processed and the desired cutting operation(s) to be performed on the particular piece of muntin bar stock. For example, the computer may select one size of punch 102 from the set of punches 100 for one size of muntin bar stock and a different size of punch from the set of punches for a different size of muntin bar stock. As another example, the computer may select one type of punch 102 from the set of punches for forming a hole into which a joining key is inserted and a different type of punch for forming a half lap joint notch in the muntin bar stock. When the plurality of different punches 102 are arranged in a linear array, as illustrated in FIG. 10, the computer can select a specific punch by translating the linear array relative to the muntin bar stock until a particular punch in the array is positioned over (or under) the muntin bar stock.

Cutting system 18 can include actuators (e.g., pneumatic actuators) associated with each set of punches 100. Operating under the control of the computer running cutting system 18, an actuator can be engaged to cause the actuator to drive a select one of the plurality of punches 102 into the muntin bar stock. In some examples, cutting system 18 can control how far the punch drives into the muntin bar stock by controlling the stroke length of the actuator. For example, cutting system 18 may drive a punch 102 from either the first set of punches 100A and/or the second set of punches 100B halfway into the piece of muntin bar stock. This can form a hole in the top of the muntin bar stock and/or bottom of the muntin bar stock, respectively. Alternatively, cutting system 18 may drive a punch 102 from either the first set of punches 100A and/or the second set of punches 100B all the way through the piece of muntin bar stock. This can form a hole that extends through the top and bottom of the muntin bar stock or carve out a notch in the side of the muntin bar stock. The particular type of punch 102, the depth the punch is driven, and location of the punch along the length of the muntin bar can vary, e.g., based on the particular type of muntin bar being fabricated. Accordingly, cutting system 18 can produce a variety of custom pieces of muntin bar.

In some examples, cutting system 18 includes additional features to help create clean cuts/punches so the muntin bar stock is not marred or bent when performing a cutting operation. As one example, cutting system 18 may include a vacuum line that draws cutting debris and chips away from the system and discharges them into a waste container. As another example, cutting system 18 may include a fluid delivery system that sprays fluid on cutter 94 and, in particular, end mill 96 as the end mill cuts into a piece of muntin bar stock. The fluid can help cool the end mill 96, remove cutting debris and chips from the face of the end mill, and act as a lubricant for the cutting tool. In the configuration of FIG. 9, cutting system 18 includes a fluid delivery pump 104 (an associated fluid lines, not illustrated) to deliver cutting fluid to cutter 94. In different examples, the fluid used may be a hydrocarbon (e.g., low molecular weight oil) or aqueous fluid. For example, the fluid may be alcohol (e.g., ethanol, propanol), which provides the benefit of evaporating after cutting without leaving a residual film.

Figure 11A:
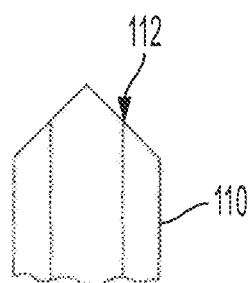
FIGS. 11A-11E are images showing example cuts that can be made on a piece of muntin bar stock using the system of FIG. 1.
Figure 11C:
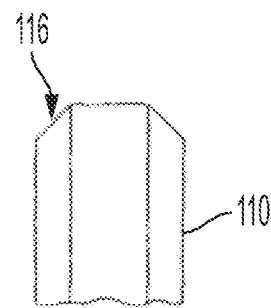
Figure 11B:
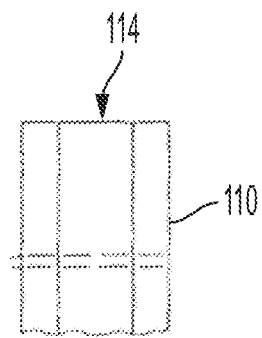
Figure 11D:
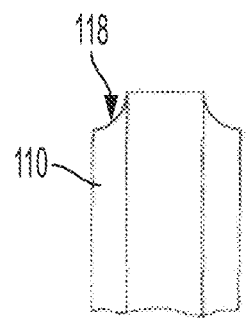
Figure 11E:
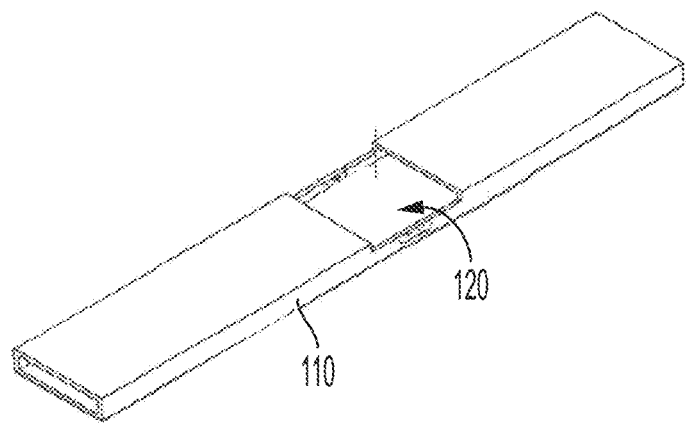

Cutting system 18 can perform a variety of different cutting operations on a piece of muntin bar stock using cutter 94 and/or punches 102. The cuts made to muntin bar stock using cutter 94 and/or punches 102 can be linear shaped cuts, arcuate shaped cuts, and/or holes that pierce into the muntin bar stock. FIGS. 11A-11E are images showing example cuts that can be made on a piece of muntin bar stock using cutting system 18. FIG. 11A illustrates a miter or angle cut 112 that can be made on the end face of a piece of muntin bar stock and/or an individual muntin bar 110 formed from the muntin bar stock. FIG. 11B illustrates a transverse or flat cut 114 that can be made on the end face of a piece of muntin bar stock and/or an individual muntin bar 110 formed from the muntin bar stock. For example, making a transverse cut as shown in FIG. 11B can separate an individual muntin bar from a remainder of the muntin bar stock. FIG. 11C illustrates a fish mouth cut 116 that can be made on the end face of a piece of muntin bar stock and/or an individual muntin bar 110 formed from the muntin bar stock. FIG. 11D illustrates a beveled cut 118 that can be made on the end face of a piece of muntin bar stock and/or an individual muntin bar 110 formed from the muntin bar stock. FIG. 11E illustrates a notch cut 120 that can be made along the length a piece of muntin bar stock and/or an individual muntin bar 110 formed from the muntin bar stock. The notch cut 120 may remove a side section of the muntin bar for forming a half lap joint.

The specific cutting operations performed on a piece of muntin bar stock and the locations on the stock where those cutting operations are performed can vary depending on the design of the muntin bar assembly being produced. For example, in operation, bar feed device 16 may feed a piece of muntin bar stock into cutting system 18 for multiple cutting operations. Bar feed device 16 may feed a first end of a piece of muntin bar stock into cutting system 18, whereupon the muntin bar stock is clamped and a first cutting operation is performed on or adjacent a clamped section of the muntin bar stock. For example, cutting system 18 may use cutter 94 to cut (e.g., shape) the first end of the muntin bar stock inserted into the system. Additionally or alternatively, cutting system 18 may select one or more punches 102 to punch the muntin bar stock (e.g., forming a notch cut and/or joining key hole).

After releasing the clamping, bar feed device 16 can push the first end of the piece of muntin bar stock farther into and/or through cutting system 18, exposing a separate section of the muntin bar stock on which a second cutting operation can be performed. For example, after pushing the piece of muntin bar stock farther into cutting system 18, the muntin bar stock may be clamped and a second cutting operation performed on or adjacent the clamped section of muntin bar stock. In one example of such an operation, cutting system 18 may make a transverse cut on the muntin bar stock using cutter 94, thereby separating an individual piece of muntin bar from a remainder of the muntin bar stock. Cutting system 18 may or may not further shape the end of the individual muntin bar formed by making the transverse cut before discharging the muntin bar from the cutting system.

Muntin bars formed using muntin fabrication system 10 are discharged from cutting system 18 onto discharge table 20 (FIG. 1). An operator may stand at discharge table 20 and assemble the individual pieces of muntin bar discharged from cutting system 18 into a complete muntin bar assembly suitable for insertion between opposed panes of an IG unit. Depending on the size of the muntin bar assembly being formed and the length of muntin bar stock used, multiple individual pieces of muntin bar may be fabricated from a single piece of muntin bar stock. In practice, waste pieces of muntin bar stock may also be generated and discharged from cutting system 18 during the fabrication pieces of muntin bar intended for incorporation of a muntin bar assembly. The waste pieces of muntin bar stock may be end sections of the muntin bar stock (e.g., after cutting off one or more muntin bars) that are not long enough to fabricate into a useable muntin bar.

If waste pieces of muntin bar stock are discharged onto table 20 and comingled with good pieces of muntin bar intended for building a muntin bar assembly, it can be difficult and time consuming for an operator to separate out the good pieces from the waste pieces. For this reason, muntin bar fabrication system 10 may further process and/or control the discharge of the waste pieces of muntin bar to prevent operator confusion. In one example, muntin bar fabrication system 10 cuts the waste pieces of muntin bar stock into a plurality of smaller pieces before discharging the pieces from cutting system 18, such as pieces smaller in length than any individual muntin bars being used to fabricate an assembly. An operator can quickly separate the waste pieces of muntin bar from the good pieces based on the length of the bars. Additionally or alternatively, waste pieces of muntin bar stock may be discharged to a waste reservoir instead of on top of discharge table 20 to prevent comingling of the good pieces and the waste pieces.

Figure 12A:
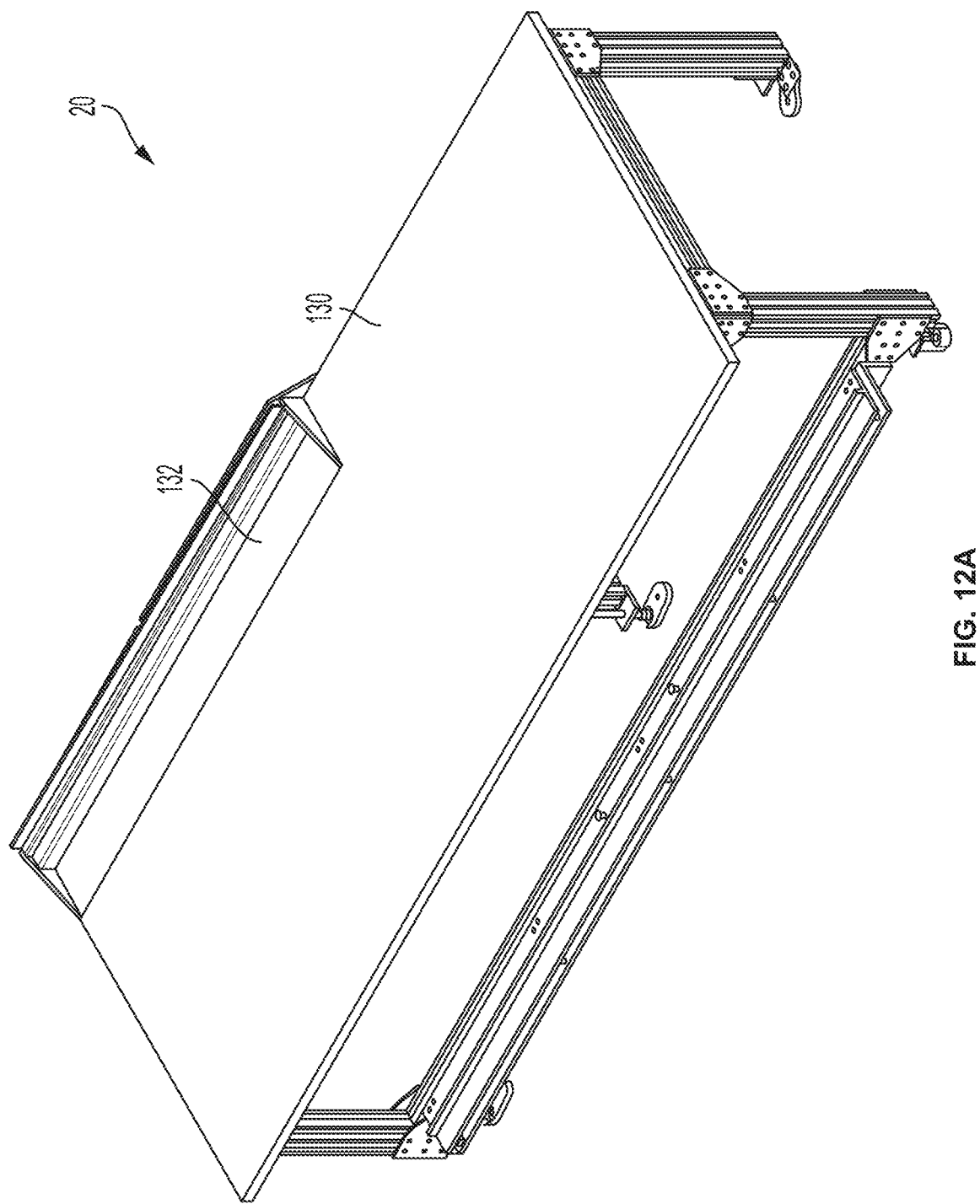
FIGS. 12A and 12B illustrate an example configuration of a discharge table that can be used in the example system of FIG. 1.
Figure 12B:
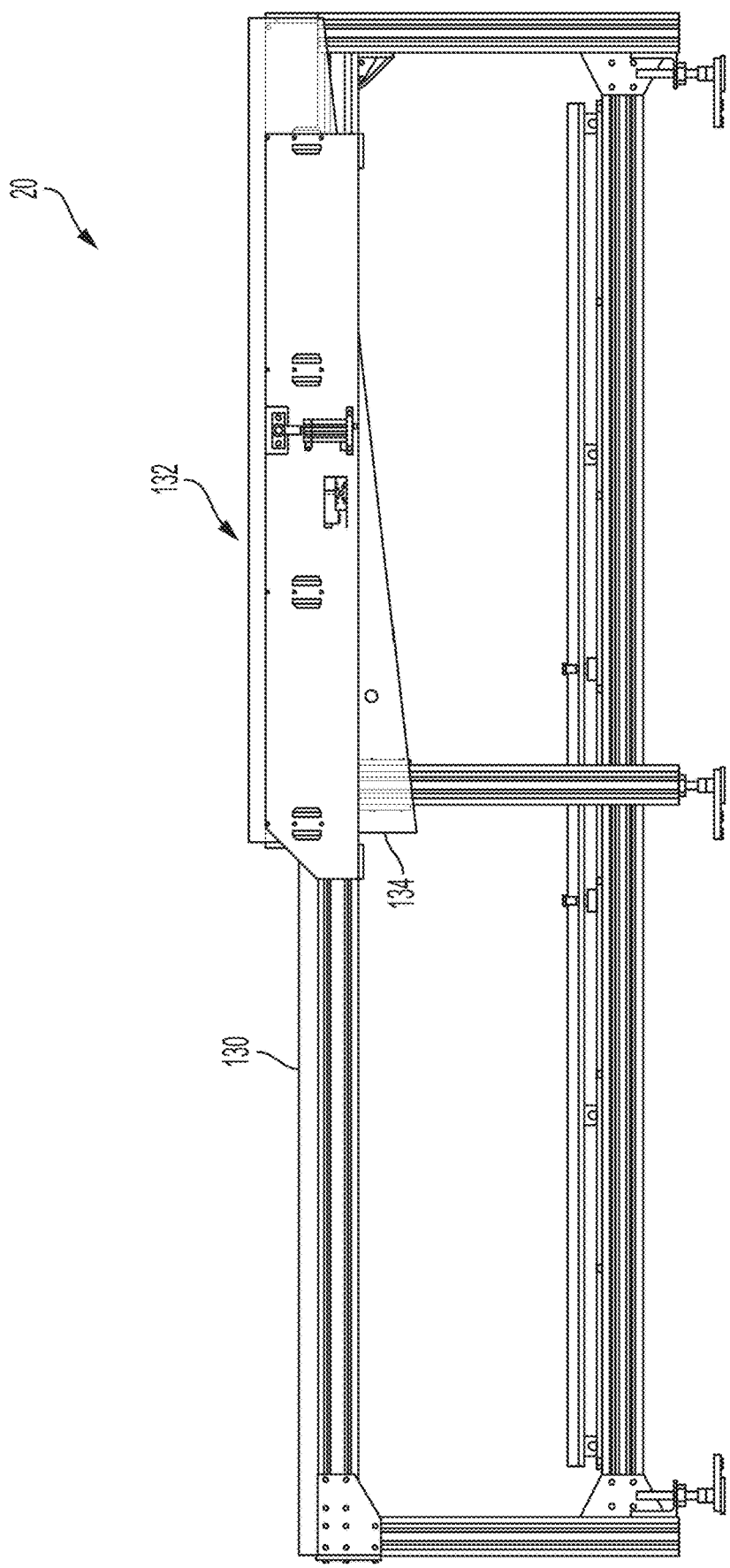

FIGS. 12A and 12B illustrate an example configuration of discharge table 20 that can be used in muntin bar fabrication system 10 and that has a separate outlet for conveying waste pieces of muntin bar. FIG. 12A is a perspective view of the example discharge table 20, and FIG. 12B is a rear view of the example table. In the illustrated example, discharge table 20 has a planar work surface 130 supported by at least one support member (which is illustrated as four legs). Discharge table 20 includes a discharge surface 132 upon which pieces of muntin bar discharged from cutting system 18 land. Discharge surface 132 forms the top surface of a discharge chute 134, which is configured to direct pieces of waste muntin bars away from work surface 130.

In normal operation, discharge chute 134 is lowered as shown in FIG. 12B such that muntin bars discharged from cutting system 18 land on discharge surface 132 and can slide over to work surface 130 for assembling a muntin bar assembly. When muntin bar fabrication system 10 prepares to discharge a piece of waste muntin bar stock, however, the computer controlling the system can articulate discharge chute 134 from a first position in which it is lowered (as illustrated in FIG. 12B) to a second position in which the discharge chute is raised. When raised, waste pieces of muntin bar stock discharging from cutting system 18 are directed into discharge chute 134 (and, optionally, a scrap reservoir positioned at the end thereof) instead of onto discharge surface 132. This segregates the waste pieces of muntin bar stock from the good pieces of muntin bar discharged onto work surface 130. Discharge chute 134 can again be lowered to receive good pieces of muntin bar on top of work surface 130. In this regard, discharge chute 134 can function as a scrap collection system.

Figure 13A:
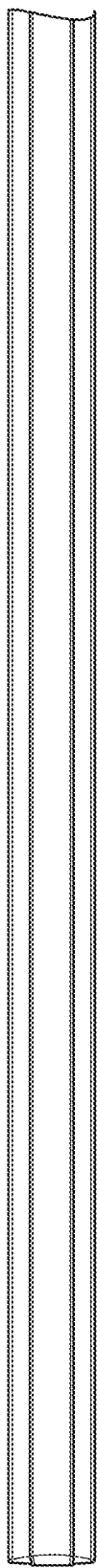
FIGS. 13A and 13B illustrate example contoured muntin bar stock that can be processed on the example system of FIG. 1.
Figure 13B:
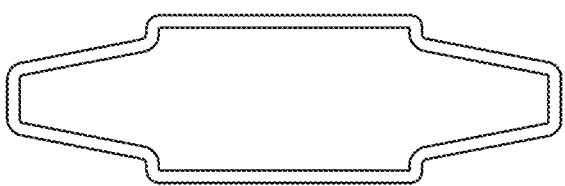

Muntin bar fabrication system 10 can process any types of muntin bar stock. In general, each piece of muntin bar stock may be a hollow, elongate member having a length greater than a width and height. In different examples, muntin bar stock may be formed of a metal (e.g., aluminum, stainless steel), a polymer (e.g., vinyl), wood, or other material. Muntin bar stock processed on muntin bar fabrication system 10 can be of any size and can have any cross-sectional shape. For example, muntin bar stock can have any polygonal cross-sectional shape (e.g., square, rectangle), arcuate cross-sectional shape (e.g., circular, elliptical), or combinations of polygonal and arcuate shape. In one example, the muntin bar stock processed on muntin bar fabrication system 10 has a contoured profile with a rectangular center that tapers toward the top and bottom of the stock along the height of the muntin bar. FIGS. 13A and 13B illustrate such an example contoured muntin bar stock, although other types of muntin bar stock can be used without departing from the scope of the disclosure.

FIG. 14 is a functional block diagram illustrating example components of a muntin bar fabrication that can be used for system 10 described above. The example system includes a processor 200, memory 202, muntin bar pull mechanism 204, muntin bar stock extraction device 206, muntin bar stock feed device 208, and cutting system 210. Processor 200 is communicatively coupled to memory 202, muntin bar pull mechanism 204, muntin bar stock extraction device 206, muntin bar stock feed device 208, and cutting system 210 via wired and/or wireless connections. In addition, the illustrated system includes a user interface 212 communicatively coupled to processor 200. User interface 212 may generally include a display screen or other output media, and user input media.

Processor 200 runs software stored in memory 202 to perform the functions attributed to a muntin bar fabrication system (and/or a computer of such system) in this disclosure. Memory 202 stores software and data used or generated by processor 200. For example, memory 202 may store data used by processor 200 to determine the type or types of muntin bar stock that need to be extracted and the type(s) of cutting operations that need to be performed on that muntin bar stock to fabricate the individual pieces of muntin bar required for fabricating a muntin bar assembly.

In operation, processor 200 can receive a request to fabricate one or more muntin bar assemblies. For example, processor 200 may receive a request to fabricate multiple muntin bar assemblies where at least one muntin bar assembly is formed of different muntin bars (e.g., different size, shape, and/or color muntin bars) than at least one other muntin bar assembly. Processor 200 may receive the request through operator input at user interface 212. Additionally or alternatively, processor 200 may receive the request from a separate computer, such as a computer that controls production scheduling, via a wired or wireless connection.

In response to receiving the request to fabricate one or more muntin bar assemblies, processor 200 may determine the specific types of muntin bars needed and the amount of each of these types of muntin bars to be produced for each particular muntin bar assembly. Processor 200 may reference production information stored in memory 202 relating each muntin bar assembly to information identifying the characteristics of the individual muntin bars needed to fabricate that assembly (e.g., number of individual muntin bars, type of muntin bars, size of each muntin bar, cut locations on each muntin bar, punch locations on each muntin bar). Processor 200 can then control the operating components of the muntin bar fabrication system to produce the individual muntin bars needed to form the requested muntin bar assembly.

For example, in response to receiving a request to produce a particular muntin bar assembly, processor 200 can control bar pull mechanism 204 and/or bar extraction device 206 to extract one or more pieces of muntin bar stock needed to produce the muntin bar assembly. Processor 200 can determine which type of muntin bar stock to extract and location of that particular type of muntin bar stock within first muntin bar stock storage assembly 12A or second muntin bar stock storage assembly 12B, e.g., based on the type of muntin bar assembly requested for fabrication and information stored in memory 200.

If the required muntin bar stock is located in first muntin bar stock storage assembly 12A, processor 200 can control bar pull mechanism 204 to move the mechanism to a select one of the plurality of receiving cavities 24 containing the muntin bar stock. Thereafter processor 200 can control bar pull mechanism 204 to extract the muntin bar stock from the selected receiving cavity and further control bar extraction device 206 to extract the piece of muntin bar stock pulled by the bar pull mechanism. If the required muntin bar stock is located in second muntin bar stock storage assembly 12B, processor 200 can control bar extraction device 206 to move the mechanism to a select one of containers 40 (in configurations where there are multiple containers) and/or a select receiving cavity within the selected container. Processor 200 can further control muntin bar extraction device 206 to extract the piece of muntin bar stock from the selected receiving cavity.

Processor 200 can control extraction device 206 to cause the extraction device to translate over to muntin bar feed device 208 and deposit an extracted piece of muntin bar stock in the feed device. Once deposited on or in muntin bar feed device 208, processor 200 can control the muntin bar feed device to advance the muntin bar stock into cutting system 210. For example, processor 200 may control muntin bar feed device 208 with instructions stored in memory 202 to push the piece of muntin bar stock into cutting system 210 a first distance, e.g., such that a first terminal end of the muntin bar stock is positioned inside of the cutting system. Processor 200 may then control muntin bar feed device 208 to cease pushing the piece of muntin bar stock while cutting system 210 performs one or more cutting operations on the terminal end of the stock. Thereafter, processor 200 may control muntin bar feed device 208 to push the piece of muntin bar stock into cutting system 210 a second distance greater than the first distance, e.g., such that the first terminal end of the muntin bar stock is pushed beyond the cutting system and an intermediate section of the stock is positioned in the cutting system. Processor 200 may then control muntin bar feed device 208 to cease pushing the piece of muntin bar stock so cutting system 210 can perform one or more cutting operations on the muntin bar stock.

In some configurations, processor 200 is communicatively coupled to a sensor (e.g., optical sensor) that evaluates the piece of muntin bar stock loaded into muntin bar feed device 208, e.g., to ensure that the muntin bar stock in properly oriented before being fed into cutting system 210. Processor 200 can compare data received from the sensor to data stored in memory 202 to determine if the right type of muntin bar stock is loaded into muntin bar feed device 208 and/or if the muntin bar stock is properly oriented within the muntin bar feed device. Based on the comparison, processor 200 may perform various actions. For example, processor 200 may control user interface 212 to provide audible and/or visual alerts if there is an error in the type or orientation of the muntin bar stock in the muntin bar feed device. Additionally or alternatively, processor 200 may control the fabrication system to reorient the muntin bar stock, e.g., by rotating the muntin bar stock 180 degrees.

With reference to instructions stored in memory 202, processor 200 can control cutting system 210 to perform one or more cutting operations on the piece of muntin bar stock inserted into the system. The cutting operations may be selected based on the characteristics of the individual piece of muntin bar being fabricated for the muntin bar assembly requested. Processor 200 may control jaws within cutting system 210 to clamp the piece of muntin bar stock inserted into the cutting system. Thereafter, processor 200 may control a cutter (e.g., multi-axis cutter) and/or punch(es) within cutting system 210 to perform one or more cutting operations on or adjacent the clamped piece of muntin bar stock.

For example, processor 200 may control a cutter to cut the piece of muntin bar stock inserted into cutting system 210. In some examples, processor 200 first controls the cutter to select a particular type of cutting head to be used based on the type of muntin bar stock being processed and/or the desired cutting operation(s) to be performed. Processor 200 may control the cutter to deposit a cutting head currently held by the cutter in a tool holding block and withdraw a different tool from the tool holding block specifically selected for the type of muntin bar stock being processed and/or cutting operation to be performed. Processor 200 may then control the cutter to perform one or more cuts on the piece of muntin bar stock.

In addition, processor 200 can control cutting system 210 to select a specific punch or punches for engagement. With reference to memory 202, processor 200 can select the punch(es) based on the specific type of muntin bar stock being processed and/or the desired cutting operation(s) to be performed on the particular piece of muntin bar stock. For example, processor 200 may select one size and/or shape of punch from a set of punches for one size and/or shape of muntin bar stock and a different size and/or shape of punch from the set of punches for a different size and/or shape of muntin bar stock. Processor 200 may further select the specific set of punches to be used (e.g., upper punches, lower punches, or both) based on the specific type of muntin bar stock being processed and/or the desired cutting operation(s) to be performed.

Processor 200 can control bar feed mechanism 208 to position the muntin bar stock being worked upon at locations within cutting system 210 needed to perform cutting operation(s) required for the specific muntin bar assembly requested for fabrication. After fabricating an individual muntin bar for the muntin bar assembly requested, processor 200 can control bar feed mechanism 208 to discharge the muntin bar on a discharge table. In some examples, processor 200 is communicatively coupled to the discharge table and can control the discharge table to separate waste pieces of muntin bar from pieces of muntin bar used for fabricating a muntin bar assembly. For example, processor 200 may control the discharge table to selectively articulate and/or move the table, causing waste pieces discharge to route to a waste reservoir instead of an assembly area of the table.

A muntin bar fabrication system according to the disclosure can efficiently produce a wide variety of different types of muntin bar assemblies without requiring extended downtime to change muntin bar stock, tooling, and other components needed to fabricate different muntin bar assemblies. The system can hold different types of muntin bar stock, such as muntin bar stock that has different sizes, different shapes, different colors, and/or different materials of construction. In response to receiving a request to fabricate a particular type of muntin bar assembly, the system can select the type of muntin bar stock needed to fabricate that muntin bar assembly. The system can then control the cutting system to cut all the muntin bars needed for the assembly from that muntin bar stock. For example, the system can control the cutting system to cut the muntin bar stock to the lengths required for the individual pieces of the assembly. The system can further control the cutting system to make the necessary cuts/punches to each individual piece necessary for forming the final assembly.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a non-transitory computer-readable medium, such as a computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method comprising:
extracting one of a plurality of different types of muntin bar stock from a muntin bar stock storage assembly and conveying the extracted muntin bar stock to a muntin bar stock feed device;
depositing the extracted muntin bar stock on the muntin bar stock feed device;
feeding the extracted muntin bar stock into a cutting system via the muntin bar stock feed device; and
performing one or more cutting operations on the extracted muntin bar stock within the cutting system and thereby fabricating one or more individual muntin bars from the extracted muntin bar stock.

2. The method of claim 1, wherein performing one or more cutting operations on the extracted muntin bar stock comprises using a multi-axis rotor to at least one of cut the extracted muntin bar stock transversely to separate an individual muntin bar from a remainder of the extracted muntin bar stock, cutting a notch into the extracted muntin bar stock, the notch being configured to receive a joining key for joining different sections of muntin bar, and angle cutting to shape an end of the individual muntin bar.

3. The method of claim 1, further comprising selecting a punch from a plurality of different punches within the cutting system and driving the punch into the extracted muntin bar stock within the cutting system.

4. The method of claim 1, further comprising clamping the extracted muntin bar stock prior to performing the one or more cutting operations.

5. The method of claim 1, wherein extracting one of the plurality of different types of muntin bar stock from the muntin bar stock storage assembly comprises extracting one of the plurality of different types of muntin bar stock from a first muntin bar stock storage assembly loaded piece-by-piece with individual pieces of muntin bar stock and a second muntin bar stock storage assembly loaded with at least one container containing a plurality of pieces of muntin bar stock.

6. The method of claim 5, further comprising pulling a piece of muntin bar stock longitudinally out of the first muntin bar stock storage assembly prior to extracting one of the plurality of different types of muntin bar stock from the muntin bar stock storage assembly.

7. The method of claim 1, further comprising:
discharging the one or more individual muntin bars from the cutting system onto a work surface of a discharge table;
articulating the discharge table to a position in which the discharge table directs muntin bar stock discharged from the cutting system to scrap collection; and
discharging scrape muntin bar stock from the cutting system to scrap collection.

8. The method of claim 1, wherein each of the plurality of different types of muntin bar stock comprise an elongated tubular member, and wherein at least one of the plurality of different types of muntin bar stock has at least one of a different size, a different shape, and a different color than at least one other of the plurality of different types of muntin bar stock.

* * * * *